(12) United States Patent
Lopez Uran et al.

(10) Patent No.: US 11,912,462 B2
(45) Date of Patent: *Feb. 27, 2024

(54) SUPPORT MODULE

(71) Applicant: CHEP Technology Pty Limited, Sydney (AU)

(72) Inventors: Daniel Lopez Uran, London (GB); Christophe Loiseau, Saint Pryvé Saint Mesmin (FR); Malcolm Charles Cant, Wokingham (GB)

(73) Assignee: CHEP Technology Pty Limited, Sydney (AU)

(*) Notice: Subject to any disclaimer, the term of this patent is extended or adjusted under 35 U.S.C. 154(b) by 0 days.

This patent is subject to a terminal disclaimer.

(21) Appl. No.: 18/066,338

(22) Filed: Dec. 15, 2022

(65) Prior Publication Data

US 2023/0111764 A1  Apr. 13, 2023

Related U.S. Application Data

(63) Continuation of application No. 16/763,351, filed as application No. PCT/IB2018/058868 on Nov. 12, 2018, now Pat. No. 11,542,062.

(30) Foreign Application Priority Data

Nov. 16, 2017 (GB) ...................... 1718954

(51) Int. Cl.
*B65D 19/42* (2006.01)
*B65D 19/00* (2006.01)
*B65D 19/44* (2006.01)

(52) U.S. Cl.
CPC ......... *B65D 19/42* (2013.01); *B65D 19/0014* (2013.01); *B65D 19/44* (2013.01);
(Continued)

(58) Field of Classification Search
CPC ................... B65D 19/42; B65D 19/44; B65D 2519/00935; B65D 2519/00955; B65D 2519/00273; B65D 2519/00333; B65D 2519/00815; B65D 2519/0096; B65D 2519/00965
USPC ....................................... 108/53.1
See application file for complete search history.

(56) References Cited

U.S. PATENT DOCUMENTS

| | | |
|---|---|---|
| 1,749,270 A | 3/1930 | Young |
| 1,836,885 A | 12/1931 | Stuebing, Jr. |

(Continued)

FOREIGN PATENT DOCUMENTS

| | | |
|---|---|---|
| CN | 103101705 | 5/2013 |
| CN | 104093488 | 10/2014 |

(Continued)

OTHER PUBLICATIONS

Extended European Search Report for European Patent Application No. 18877534.0, dated Jul. 27, 2021, (9 pages), European Patent Office, Munich, Germany.

(Continued)

*Primary Examiner* — Jose V Chen
(74) *Attorney, Agent, or Firm* — Alston & Bird LLP

(57) ABSTRACT

A platform including a top deck is configured to receive a pallet when stacked thereon. The top deck includes at least one integrally formed recessed support configured to receive a pallet support of the pallet. The at least one recessed support includes a perimeter recessed in the top deck and which defines a cavity configured to receive the pallet support.

19 Claims, 21 Drawing Sheets

(52) U.S. Cl.
CPC ............ *B65D 2519/00034* (2013.01); *B65D 2519/00069* (2013.01); *B65D 2519/0096* (2013.01); *B65D 2519/00273* (2013.01); *B65D 2519/00288* (2013.01); *B65D 2519/00318* (2013.01); *B65D 2519/00333* (2013.01); *B65D 2519/00407* (2013.01); *B65D 2519/00572* (2013.01); *B65D 2519/00781* (2013.01); *B65D 2519/00815* (2013.01)

(56) References Cited

U.S. PATENT DOCUMENTS

| | | | |
|---|---|---|---|
| 2,553,273 | A | 5/1951 | Phillips |
| 2,775,313 | A | 12/1956 | Kurvers et al. |
| 2,863,568 | A | 12/1958 | Skubic |
| 4,212,093 | A | 7/1980 | Lombard |
| 5,445,396 | A | 8/1995 | Sebor |
| 5,711,540 | A | 1/1998 | Nesting |
| D456,972 | S | 5/2002 | Blason et al. |
| 6,979,005 | B1 | 12/2005 | McLerran |
| 7,090,078 | B2 | 8/2006 | Gits |
| 8,511,239 | B2 * | 8/2013 | Lin .................. B65D 19/0038 108/57.25 |
| 8,851,287 | B2 | 10/2014 | Becklin |
| 9,573,421 | B2 | 2/2017 | Tiilikainen et al. |
| 11,542,062 | B2 * | 1/2023 | Lopez Uran ........... B65D 19/44 |
| 2002/0178973 | A1 | 12/2002 | Tan |
| 2003/0205877 | A1 | 11/2003 | Verna et al. |
| 2005/0151336 | A1 | 7/2005 | Neuman |
| 2007/0186827 | A1 | 8/2007 | Loftus et al. |
| 2008/0149005 | A1 | 6/2008 | Stahl et al. |
| 2009/0236809 | A1 * | 9/2009 | Carver .................. B60T 1/14 280/43.12 |
| 2013/0119623 | A1 | 5/2013 | Sadeh et al. |
| 2013/0119624 | A1 | 5/2013 | Stubbs |
| 2013/0121800 | A1 | 5/2013 | Hacko et al. |
| 2013/0154218 | A1 | 6/2013 | Tiilikainen |
| 2013/0249178 | A1 | 9/2013 | Grosse-Plankermann |
| 2015/0068436 | A1 | 3/2015 | Zelek et al. |
| 2015/0203138 | A1 | 7/2015 | Hassell et al. |
| 2016/0167831 | A1 * | 6/2016 | Suiter ................ B65D 19/0004 108/55.3 |
| 2016/0311453 | A1 | 10/2016 | Thompson et al. |
| 2018/0127148 | A1 | 5/2018 | Kuhn et al. |
| 2019/0031222 | A1 | 1/2019 | Takyar et al. |
| 2019/0031394 | A1 | 1/2019 | Millhouse |
| 2021/0229861 | A1 | 7/2021 | Holmberg |
| 2021/0316899 | A1 | 10/2021 | Uran |

FOREIGN PATENT DOCUMENTS

| | | |
|---|---|---|
| DE | 20103552 | 5/2001 |
| DE | 20219619 | 4/2003 |
| DE | 20219619 | 6/2003 |
| DE | 20309286 | 10/2003 |
| DE | 202005003786 | 9/2005 |
| DE | 102005012675 | 9/2006 |
| DE | 202010016859 | 3/2011 |
| DE | 202012103711 | 11/2012 |
| DE | 202012008319 | 1/2013 |
| DE | 202013007560 | 10/2013 |
| DE | 102012017221 | 3/2014 |
| DE | 102014002832 | 8/2015 |
| DE | M9506570-0001 | 9/2015 |
| DE | 202014007703 | 1/2016 |
| DE | 102015107353 | 3/2016 |
| DE | 202017004490 | 1/2018 |
| DE | 202018000701 | 2/2018 |
| DE | 402017203993-0002 | 2/2018 |
| DE | 402017203993-0003 | 2/2018 |
| DE | 402017203993-0004 | 2/2018 |
| DE | 402017203993-0001 | 3/2018 |
| DE | 202018006182 | 6/2019 |
| DE | 102018125886 | 4/2020 |
| EM | 001172969-0012 | 11/2006 |
| EM | 000370234-0001 | 10/2007 |
| EM | 000370234-0002 | 10/2007 |
| EM | 000370234-0008 | 10/2007 |
| EM | 000370234-0009 | 10/2007 |
| EM | 001172969-0016 | 5/2009 |
| EM | 001172969-0017 | 5/2009 |
| EM | 001172969-0018 | 5/2009 |
| EM | 001172969-0019 | 5/2009 |
| EM | 001172969-0020 | 5/2009 |
| EM | 001172969-0021 | 5/2009 |
| EM | 001172969-0011 | 11/2009 |
| EM | 002365957-0001 | 12/2013 |
| EM | 002365957-0002 | 12/2013 |
| EM | 002365957-0003 | 12/2013 |
| EP | 0861194 | 7/2000 |
| EP | 0912408 | 5/2001 |
| EP | 1744971 | 4/2004 |
| EP | 1304293 | 9/2004 |
| EP | 1689650 | 8/2006 |
| EP | 1927552 | 6/2008 |
| EP | 2860126 | 10/2013 |
| EP | 2860127 | 10/2013 |
| EP | 2952439 | 6/2014 |
| EP | 2709921 | 12/2015 |
| EP | 2952440 | 12/2015 |
| EP | 3124391 | 3/2016 |
| EP | 3254983 | 6/2016 |
| EP | 2671815 | 10/2016 |
| EP | 3098136 | 11/2016 |
| EP | 2547595 | 8/2017 |
| EP | 2965998 | 8/2017 |
| EP | 3093250 | 11/2017 |
| EP | 3254984 | 12/2017 |
| EP | 3330196 | 6/2018 |
| EP | 3372519 | 9/2018 |
| EP | 3480128 | 5/2019 |
| EP | 3533722 | 9/2019 |
| EP | 3536624 | 9/2019 |
| EP | 2623392 | 12/2019 |
| EP | 2733043 | 12/2019 |
| GB | 904198 | 8/1962 |
| GB | 1583763 | 2/1981 |
| GB | 1025244 | 4/1987 |
| GB | 2052205 | 8/1995 |
| GB | 2061785 | 6/1996 |
| GB | 2389101 | 12/2003 |
| GB | 2425999 | 11/2006 |
| GB | 2465398 | 5/2010 |
| JP | 4073245 B2 | 4/2008 |
| JP | 4488832 B2 | 6/2010 |
| KR | 19990036930 | 10/1999 |
| NL | 1037178 | 5/2009 |
| WO | WO DM/035715-1 | 5/1996 |
| WO | WO9625334 | 8/1996 |
| WO | DM/058297-1 | 1/2002 |
| WO | WO0200515 | 1/2002 |
| WO | WO2004037662 | 5/2004 |
| WO | WO2009016339 | 2/2009 |
| WO | WO-2010/064896 A1 | 6/2010 |
| WO | WO2011046260 | 4/2011 |
| WO | WO2011115674 | 9/2011 |
| WO | WO2014022498 | 2/2014 |
| WO | WO2016005136 | 1/2016 |
| WO | WO2016193538 | 12/2016 |
| WO | WO2017130167 | 8/2017 |
| WO | WO2019097389 | 5/2019 |

OTHER PUBLICATIONS

Communication Pursuant to Article 94(3) EPC for European Patent Application No. 18877534.0, dated Mar. 1, 2023, (7 pages), European Patent Office, Munich, Germany.

International Search Report and Written Opinion for International Application No. PCT/IB2018/058868, dated Jan. 23, 2019, (21 pages), Australian Patent Office, Woden ACT, Australia.

* cited by examiner

SUPPORT MODULE

This application is a continuation application of Ser. No. 16/763,351 filed May 12, 2022, which is a national stage application of PCT/IB2018/058868 filed Nov. 12, 2018 which claims priority to GB 1718954.9 filed Nov. 16, 2017 which are hereby incorporated herein in their entireties by reference.

The present invention relates to a support module for a platform.

Pallets for distributing products from one location to another are well known. Such pallets can be provided in a range of sizes. Examples of such pallets may comprise platforms provided with supports, which can include feet or wheels. The wheels may be fixed wheels or caster wheels. Fixed wheels and caster wheels are incorporated in dollys, which may otherwise be referred to as wheeled pallets.

The configuration of the pallet supports can be problematic when the pallet is to be used with certain machinery. For example, it may not be possible to use the pallet in conjunction with roll conveyors due to incompatibility between the pallet supports and said conveyors or systems. For example, where the pallet supports are feet, they may become trapped between adjacent rollers of a roll conveyor and thereby risk damage to the pallet, roll conveyor and/or surrounding environment. Similarly, where the pallet supports are wheels, the wheels may become jammed between adjacent rollers of the roll conveyor.

It is known to provide a slave pallet onto which pallets can be stacked. If slave pallets are themselves compatible with roll conveyors, then stacking pallets onto the slave pallet can extend that functionality to the stacked pallets.

There are a number of disadvantages associated with existing slave pallet designs. In particular, existing slave pallets can increase the risk of toppling of goods stacked on pallets which are, in turn, stacked on the slave pallet. This can risk operator injury and damage to the goods, pallet and slave pallet. Furthermore, existing slave pallet designs may deflect to unacceptable levels due to the distribution of mass through the slave pallet.

There exists a need to overcome one or more of the disadvantages associated with existing slave pallets.

According to a first aspect of the invention there is provided a support module for a platform, the support module comprising:
  a body which defines an opening configured to receive a pallet support; and
  a lower surface configured to abut a top deck of the platform.

The support module is advantageous because the stability of a pallet stacked on the platform is improved. This is because the pallet support is held in the opening of the body. The body may be continuous so as to form a closed loop. The platform may be a slave pallet.

The support module does not significantly increase the distance by which the stacked pallet protrudes from the platform. This is desirable for reasons of reduced risk of toppling and reduced spatial requirement for storage of stacked pallets.

A further advantage is that the support module can assist with correcting the impact of an off-centering error when a pallet is stacked on the platform incorporating the support module. Because the pallet support is received in the opening, the pallet is guided toward a correctly aligned position. Errors in alignment can, similar to that explained above, lead to excessive deflection of the platform in certain sections, or to toppling of the pallet, and goods, stacked on the platform.

The abutment of the lower surface of the support module upon the top deck provides a strong and stable base about which the support module is supported. The abutment provides a simple alignment feature which allows the support module to sit flush against the top deck.

The support module also offers flexibility regarding the size and nature of a pallet incorporating the pallet support which is received in the opening. For example, if it is desired to provide two quarter pallets on a half pallet sized platform, further support modules can simply be added to the existing platform (e.g .eight support modules may be provided on the platform).

The support module is also beneficial because it can be retrofitted to existing platforms, without the need for costly redesign and/or disposal. The support module is also compatible with a range of different sizes, and varieties, of platforms and so slave pallets.

The platform may take the form of a quarter dolly but without wheels.

The support module may further comprise at least one projection configured to constrain a position of the support module on the top deck.

The at least one projection acts as a location or constraining feature. That is to say, installation of the support module onto the platform is made simpler as a result. The support module is more likely to be correctly positioned upon the top deck of the platform due to the incorporation of the at least one projection.

The location of the support module upon the top deck is of importance for reasons of correctly aligning the support module with the pallet support which is received in the opening. Incorrectly positioning the support module on the top deck could lead to misalignment of the support module opening relative to the pallet support, or relative to a platform stacked onto the support module. If this were to be the case then it may cause instability of stacked pallets or stacked platforms.

Furthermore, because the at least one projection constrains the position of the support module, other features or components, such as fasteners, for securing the support module to the top deck may be either reduced in number or not required at all (in the case of, for example, retaining clips). The at least one projection provides a stronger and more robust means of constraining the support module on the top deck than if the at least one projection were omitted.

The at least one projection may, for example, be of the form of a peg or tooth. The at least one projection may be a downwardly extending feature, with a laterally extending portion.

The support module may comprise a plurality of projections.

The plurality of projections offers a number of advantages over, for example, a single projection. The plurality of projections offers two points of locational constraint. As such, locating the support module in the top deck is simpler and more robust.

Any loading forces exerted through the projections will be distributed across at least two projections, thereby reducing peak stresses. If damage was to occur to one of the plurality of projections, there remains at least one other projection which may provide at least some of the locating functionality. The support module is therefore more robust.

The at least one projection may extends from an offset body which, in turn, extends from the body to thereby offset the at least one projection from the body.

Offsetting the offset body from the body means that the at least one projection can be received in a slot of the top deck which lies outside of a footprint of the support module. This means that, rather than increasing the footprint of the support module, the at least one projection can simply be offset to allow engagement. Increasing the footprint of the support module would otherwise lead to an undesirable increase in support module weight and size.

The offset body may incorporate an angled face to increase strength and facilitate manufacture.

The support module may further comprise an attachment feature.

The attachment feature is advantageous because the support module can be robustly secured to the platform. Furthermore, it is desirable for the support module to remain attached to the platform as the platform is moved around which may include, for example, being turned upside down.

The attachment feature may be a boss for receipt of a fastener.

The boss provides a thickened material section into which a fastener can be driven. The boss is an easily manufactured feature. The boss may incorporate a hole.

The attachment feature may be a retaining clip.

The retaining clip is a useful attachment feature because the retaining clip forms part of the support module. As such, no extra components or processes are required to secure the support module to the platform, save for the snap-fit action of the clip.

The body may comprise two short ends and two long sides.

The two long sides may each comprise a portion which is of a reduced height relative to the short ends.

The reduced height portions are beneficial because they provide positions of entry for receipt of tines of a forklift or automated racking system. Pallets stacked on the platform and support module arrangement can therefore be removed from the platform with ease. The reduced height portions also reduce the risk of damage to the support modules by the tines or other external machinery.

At least one of the two long sides may comprise one or more inwardly facing projections.

The one or more inwardly facing projections assist with locating the pallet support in the opening in a correctly aligned position.

The one or more inwardly facing projections may comprise a tooth.

The tooth is advantageous because an external geometry of the tooth is received by a groove of a foot of a pallet received in the opening. The foot, and so the pallet which incorporates the foot, is thereby held securely held in place. The tooth may be inwardly tapering. The tooth may therefore narrow to a tip at an innermost point. The tip may be rounded for improved manufacturability.

The one or more inwardly facing projections may comprise a nub.

The nub is a projection. The nub is easily manufactured and can be used to constrain a wide or square foot of a pallet received in the opening. The nub may be a rounded projection. The nub may be of the form of a generally half-cylindrical projection.

Each of the two long sides may comprise at least one inwardly facing projection.

The at least one inwardly facing projection may be two teeth and one nub. The at least one inwardly facing projection in each of the two long sides may cooperate to constrain the foot of a pallet inserted in the opening. As such, the pallet can only be lifted vertically, and the pallet is therefore prevented from sliding about the top deck of the platform.

A lower surface of the inwardly facing projections may be flush with the lower surface of the support module.

The lower surfaces being flush provide the benefit that the inwardly facing projections improve the stability of the support module by providing an increased surface area in abutment with the top deck. Furthermore, by virtue of the surfaces being flush there is no gap between the surfaces in which debris, such as packaging material, can accumulate.

A first of the two short ends may be thicker than a second short end.

The first short end being thicker than the second short end provides clearance for a cradle of a fixed or caster wheel of a pallet in the proximity of the second short end. This is advantageous for reasons of improved fitting of the pallet support at the second short end by virtue of increased clearance.

An inner face of the second short end may be at least partly arcuate for receipt of a wheel of a pallet.

The at least partly arcuate face is beneficial because the wheel can abut the face. The face thereby provides a backstop to prevent the dolly unintentionally rolling off of the platform. The at least partly arcuate face may be referred to as an arcuate region. The at least partly arcuate face also acts as a guide to correctly align the pallet support in the opening.

One of the two short ends may have a reduced height relative to the other of the two short ends. The one of the two short ends having the reduced height may comprise at least one lug which protrudes upwardly from the body. The lug may facilitate stacking, by engaging with a recess or aperture of a skid of a platform. For example, the lug may engage with a recess or aperture in a bottom surface of the skid.

The support module further may comprise at least one lug which protrudes upwardly from the body.

The lug protrudes from the body and is receivable in a lower deck of another platform stacked on the platform and support module. As such, the lug provides a stacking functionality. The lug limits, or prevents, relative movement between the adjacent platforms other than a raising/lowering motion. In other words, when the lug is received in a lower deck of the stacked platform, sliding of the stacked platform about the support module(s) is limited or prevented.

The stacking functionality provided by the at least one lug is desirable because being able to stack platforms when not in use can reduce the spatial requirement for storage of the platforms. Furthermore, as well as reducing the space required to store them, the stacked platforms are more stable as a result of the at least one lug being receivable in the lower deck of another platform.

The lug may be upwardly extending i.e. vertically extending. Alternatively, the lug may extend at an angle relative to vertical. The lug may extend from an upper platform of the second short end. The upper platform may be flat.

The support module may comprise a plurality of lugs.

The plurality of lugs is advantageous over a single lug for reasons of multiple points of constraint. Similarly, a greater distribution of loading resulting in reduced peak stresses. A plurality of lugs is also useful because the same design of support module can be used for all positions of the support module on the top deck of the platform. The plurality of lugs may therefore mirror one another about a plane of symmetry through the support module. The plurality of lugs may be two lugs.

The body may comprise two short ends and two long sides, and wherein the plurality of lugs protrude at least partly from a short end.

A first of the two short ends may be thicker than a second short end, and the plurality of lugs may protrude at least partly from the second short end.

Each of the plurality of lugs may be arcuate.

The lugs being arcuate are advantageous for a number of reasons. Firstly, the contours of the lugs can be matched to an outer edge of the body. This can make manufacture simpler. Secondly, the lugs will also be receivable in the lower deck of existing platform designs, without the platform design requiring any modification.

The body may comprise one or more guiding surfaces by which the pallet support is guideable.

Guideable is intended to mean that the pallet support can be urged into a correctly aligned position. That is to say, if the pallet support is received in the opening in an off-centre position, the one or more guiding surfaces can assist in correcting the off-centre position. The guiding surfaces may taper such that a gap between adjacent guiding surfaces narrows towards the top deck of the platform. The guiding surfaces may not be tapered over a whole height. That is to say, the guiding surfaces may be tapered only in part, and may incorporate a flat portion. The guiding surfaces may be tapered surfaces.

The support module may be symmetrical about a plane of symmetry which passes through midpoints of the short ends.

An advantage stemming from the plane of symmetry is the capability of using a single support module design for all of the positions on the top deck. This mitigates the requirement for different designs, and associated manufacturing and logistics constraints, which would otherwise be required.

According to a second aspect of the invention there is provided a platform fitted with at least one support module, the platform comprising a top deck, the support module comprising:
 a body which defines an opening configured to receive of a pallet support;
 a lower surface in abutment with the top deck of the platform; and The platform may be fitted with at least four support modules.

The platform having four support modules fitted is useful because pallets typically have four pallet supports. Four support modules means that there are a corresponding four openings for the four pallet supports. Alternatively, the platform may be fitted with more than four support modules. For example, the platform may be fitted with eight or sixteen support modules.

An outer edge of the or each support module may not extend beyond a footprint of the platform.

The risk of damage to the or each support module is reduced if the outer edge does not extend beyond the footprint of the platform. This is because, for example, in the event of a collision, the platform will be impacted before the outer edge of the or each support module. Footprint is intended to mean an outer edge of the platform when viewed from above. In other words, the footprint is the outline of the platform.

The outer edge of the or each support module may be flush with a corresponding outer edge of the platform.

The or each support module further may comprise at least one projection which penetrates the top deck of the platform to locate the support module in position.

The or each support module may comprise a plurality of projections, and the platform may comprise a plurality of slots.

A first of the plurality of projections may be received in a first of the plurality of slots, and a second of the plurality of projections may be received in a second of the plurality of slots.

The first of second of the plurality of slots may be a hand access hole.

The or each support module may be attached to the top deck by at least one fastener.

The at least one fastener may be receivable through a bore in the top deck and secured into a boss of the or each support module.

The platform may be a platform of a fractional pallet.

Fractional pallet is intended to mean, for example, a half pallet or a quarter pallet. Fractional pallet may otherwise refer to any pallet smaller than a full size pallet.

The platform may be a slave pallet. The platform may be a quarter pallet.

The pallet support may be a foot, fixed wheel or caster wheel.

At least one wheel recess may be recessed into the top deck of the platform;
 wherein an inner face of a short end of the or each support module may be at least partly arcuate for receipt of a wheel of a pallet; and
 wherein the wheel recess and the at least partly arcuate inner face cooperate to define a substantially continuous guiding surface.

Substantially continuous guiding surface is intended to mean a generally uninterrupted surface. A small gap or lip may be present between the wheel recess and the at least partly arcuate inner face.

There may be is at least one plane of symmetry through the platform and the one or more support modules.

The plane of symmetry is intended to apply to both the platform and the one or more support modules fitted to the platform.

The plane of symmetry may be a plane normal to the top deck and passing through midpoints of either two short sides of the platform or two long sides of the platform.

There may be at least two planes of symmetry through the platform and the one or more support modules.

The platform having two or more planes of symmetry means that a pallet stacked on the platform can be received in one of two orientations. That is to say, there is not a single orientation in which the pallet must be stacked onto the platform.

According to a third aspect of the invention there is provided a pallet assembly comprising a first platform according to the second aspect of the invention, and a second platform stacked on the first platform, wherein the or each support module fitted to the first platform comprises a plurality of lugs which are received in a lower deck of the second platform.

A pallet may be stacked on the platform.

The pallet may be a dolly.

According to a fourth aspect of the invention there is provided a platform configured to receive a pallet, the platform comprising:
 a top deck, the top deck comprising at least one integrally formed recessed support configured to receive a pallet support of the pallet, the at least one recessed support comprising:
 a perimeter recessed in the top deck and which defines a cavity configured to receive the pallet support.

Integration of the recessed support in the top deck further reduces the distance by which the stacked pallet protrudes from the platform. This is desirable for reasons of reduced risk of toppling and reduced spatial requirement for storage of stacked pallets. Furthermore, by moulding a cavity rather than adding a further component, there is a reduced material usage which, in turn, leads to a reduction in the weight of the platform. The recessed support also negates the need for the extra step of attaching extra components to the platform. The recessed support can instead be formed during the manufacture of the platform itself.

The cavity also guides the entry of the foot or wheel such that errors in alignment of the pallet to be stacked on the platform can be corrected. This is achieved by way of, for example, abutment of the foot or wheel against internal surfaces of the cavity.

Four or more recessed supports may be recessed in the top deck. The four or more recessed supports may be arranged such that there exists two planes of symmetry through the platform. Eight or more recessed supports may be recessed in the top deck. A lower deck may oppose the top deck.

The at least one recessed support may comprise one or more inwardly facing projections.

The at least one recessed support may comprise one or more upwardly facing projections. The upwardly facing projections may be configured to engage with a support of a pallet, such as a foot or wheel.

The platform may form part of a slave pallet. The platform may form part of a fractional pallet. The platform may form part of a half pallet. The platform may form part of a half display pallet.

According to a fifth aspect of the invention there is provided a pallet assembly comprising the platform of the fourth aspect of the invention and a pallet stacked on the platform.

The pallet may be a dolly.

According to a sixth aspect of the invention there is provided a skid configured to support a platform. The skid comprises first and second attachment portions configured to attach to a lower deck of the platform, a support portion having a supporting surface, the supporting surface configured to support the skid on a surface, a first leg extending from the first attachment portion and connecting the first attachment portion to the support portion, a second leg extending from the second attachment portion and connecting the second attachment portion to the support portion, and a space defined between the first leg, second leg and support portion and configured to provide a position of entry for receipt of a tine.

Providing a skid having a space defined between the first leg, second leg and support portion and configured to provide a position of entry for receipt of a tine allows a platform installed with the skid, or lower most platform in a stack, to be easily lifted off a surface, such as the floor, a roll conveyer, conveyer belt, and the like. This is particularly useful for lifting a platform at the end of an automated line.

The first attachment portion may be arranged at a first end of the skid and the second attachment portion may be arranged at a second end of the skid, the first and second ends being opposite.

The first leg may comprise a first alignment surface and the second leg may comprise a second alignment surface, the first and second alignment surfaces being at an incline.

Providing inclined legs of the skid assists with alignment of a platform having the skid when placing the platform on ranking beams or tines. For example, if the platform is initially off-centre from a pair of racking beams as it is loaded onto a racking beam, one of the racking beams will engage with one of the inclined legs before the other racking beam engages with the other inclined leg, causing the skid to move towards a centred position.

The first and second attachment portions may comprise attachment means configured to allow releaseable attachment to a lower deck of the platform. This allows convenient replacement of the skid should it become worn or damaged.

The attachment means may be one or more holes configured to receive one or more fasteners. The fasteners may be releasable fasteners.

The first and second legs may comprise ribs.

The support portion may comprise one or more apertures on the supporting surface, and the one or more apertures may be configured to receive one or more lugs. For example, the lug may be a lug of the support module described above. For example, the lug may be a lug of the support module of the first aspect, the lug being located at one of the two short ends having a reduced height relative to the other of the two short ends.

The support portion may comprise ribs, and wherein at least one of the one or more apertures is formed by the ribs.

The first and second attachment portions may terminate in a protrusion. The protrusion may be a lip or projection, which protrudes in a downwards direction when in normal use. The protrusion may help prevent the skid falling off a rack or tine.

The first and second attachment portions may each comprise a lower surface configure to abut a tine or racking beam. That is, the lower surface of the first and second attachment portions may be configured to be supported by a tine or racking beam.

The lower surface of each attachment portion may be located between the respective protrusion and respective leg of each attachment portion.

According to a seventh aspect of the invention there is provided a platform, the platform comprising, a top deck configured to support a pallet or dolly, a lower deck, and a skid attached to the lower deck. The skid may be a skid according to the sixth aspect.

The platform may comprise two skids. The two skids may be skids according to the sixth aspect.

The platform may further comprise a support module, the support module arranged on the top deck of the platform. The support module may be a support module according to the first aspect. The support module may be releasable attached to, or may be integrally formed with, the platform.

According to an eighth aspect of the invention there is provided a platform assembly comprising a first platform according to the seventh aspect, and a second platform according to the seventh aspect stacked on top of the first platform, wherein the or each support module of the first platform comprises one or more lugs which are received in a supporting surface of the skid of the second platform.

Embodiments of the present invention will now be described, by way of example only, with reference to the accompanying figures in which:

FIG. 2b is a plan view of the platform and support modules of FIG. 2a;

FIG. 8b is a side view of the arrangement of FIG. 8a.

FIG. 12bis a perspective view from below of the support module of FIG. 11a;

FIG. 13b is a perspective view from below of the skid of FIG. 13a;

Figure 1A:
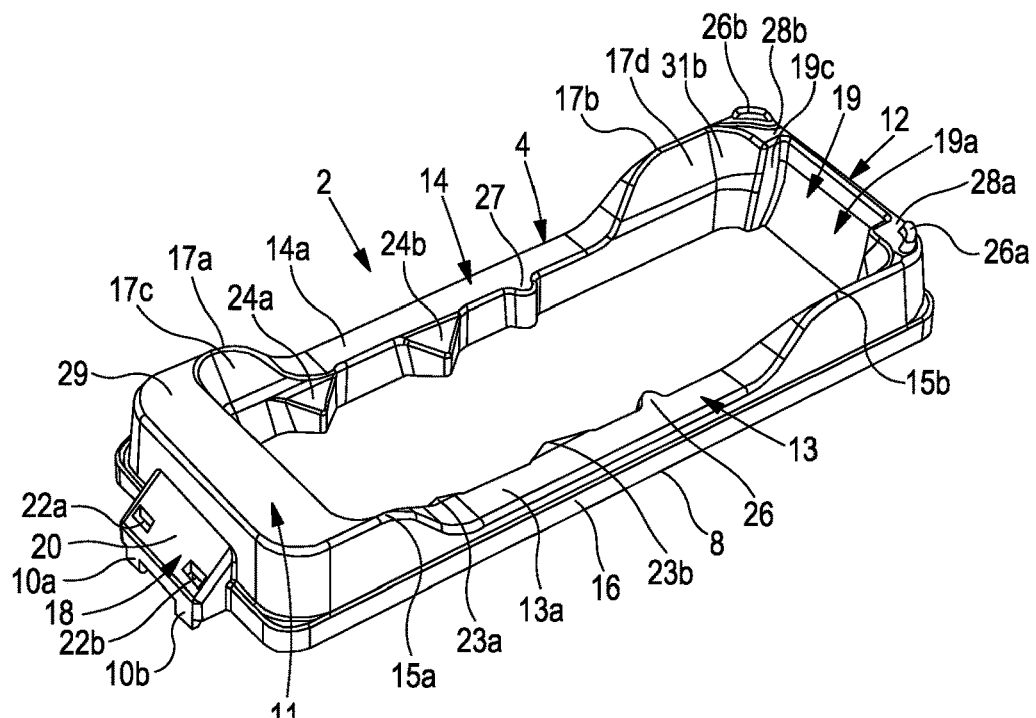
FIG. 1a is a perspective view of a support module according to an embodiment of the invention.

Referring first to FIG. 1a, a perspective view of a support module 2 is depicted which, in use, is attached to a top deck of a platform (as will be described and illustrated later in this document).

The support module 2 comprises a body 4, opening 6, lower surface 8 and projections 10a, 10b.

The body 4 has a generally rectangular outer geometry when viewed from above or below (see FIG. 1b). Corners of the body 4 are rounded. This provides improved manufacturability by injection moulding when compared with sharp corners. Rounding of the corners also allows for the body 4, and so support module 2, to follow an external perimeter of the platform, as described below in connection with FIG. 2b.

The body 4 defines the opening 6. The body 4 therefore surrounds the opening 6. The body 4 is a closed loop in form. Alternatively, the body 4 may be intermittent by being broken into constituent sections, with gaps between those sections. However, when the body is provided in the form of a closed loop the body will be stronger than when the body is broken into constituent sections.

The opening 6 is configured to receive a pallet support. Examples of pallet supports are feet and wheels. The wheels may be fixed wheels or caster wheels. The pallet supports form part of a pallet which is stacked upon the platform to which the support module 2 is attached. This is described and illustrated in more detail below. Examples of pallets are pallets which incorporate feet, and dollys, or wheeled pallets, which incorporate wheels (e.g. fixed wheels and caster wheels).

The opening 6 may be at least around 60 mm wide at the lower surface 8. The at least around 60 mm is intended to refer to a distance between parallel portions of the opening 6, excluding any inwardly facing projections (as described below). The opening 6 being at least around 60 mm wide facilitates receipt of pallet supports of quarter pallets in the opening 6.

The opening 6 may be at least around 200 mm long at the lower surface 8. The opening 6 being at least around 200 mm long at the lower surface 8 facilitates receipt of the feet of quarter pallets in one of two orientations in the opening 6.

The body 4 comprises two short ends 11, 12 and two long sides 13, 14. Of the two short ends 11, 12, there is a first short end 11 and a second short end 12. The second short end 12 is thinner than the first short end 11. The second short end 12 is thinner to accommodate a wheel when the pallet support is a wheel. This is shown in connection with FIGS. 9a and 9b.

The body 4 also incorporates a lip 16. The lip 16 defines an outer perimeter of the body 4, except for in a region surrounding an offset body 18. The offset body 18 is discussed below.

The lower surface 8 forms a base of the support module 2 and abuts a top deck of a platform in use. The lower surface 8 incorporates bosses (not visible in FIG. 1a, see FIG. 1b) into which fasteners (not shown) are driven to secure the support module 2 to the platform. The bosses include holes to receive and guide fasteners (e.g. screws) into the bosses. This ensures good alignment of the body 4 with respect to a platform (as explained further below). An underside of the support module 2 is hollow, incorporating a ribbed structure. As such, the lower surface 8 is not a continuous surface, and may be intermittent. Lowermost ends of the bosses and ribs may all lie in the same plane. This provides a flat face which abuts a top deck of a platform onto which the support module 2 is fitted.

The projections 10a, 10b extend from an offset body 18. The offset body 18 projects away from the body 4. In the illustrated embodiment the offset body 18 projects from the first short end 11. The offset body 18 is generally trapezoidal when viewed from a direction normal to a plane of symmetry through the support module 2. An angled face 20 of the offset body 18 extends outwardly from the body 4. The angled face 20 is angled to improve the ease of moulding the support module 2, and to improve strength. Ease of moulding is improved because the angled face 20 can easily be removed from a mould after manufacture. Alternatively, the angled face 20 may not be angled and may instead be, for example, horizontal or vertical. Other orientations, and shapes, of the angled face 20 are therefore suitable. Similarly, alternative arrangements of the offset body 18 may be used. For example, the offset body could be cuboidal. The angled face 20 includes two windows 22a, 22b. The windows 22a, 22b are rectangular orifices.

Figure 5:
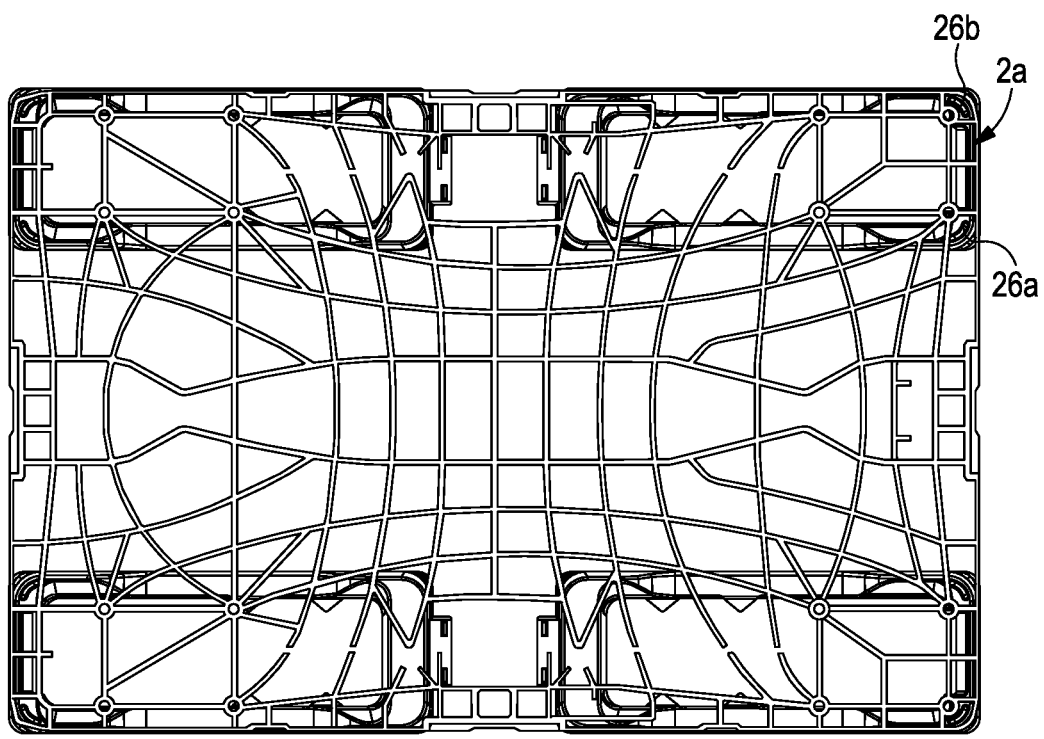
FIG. 5 is a cross-section view from above showing lugs of the support modules of FIG. 4 being received by a stacked platform lower deck.

The projections 10a, 10b assist in locating the support module 2 on the top deck of the platform. This is described and illustrated in more detail in connection with FIG. 3. The projections 10a, 10b extend from the offset body 18. In the illustrated example, the projections 10a, 10b extend downwardly. The projections 10a, 10b extend beyond the lower surface 8. That is to say, the projections 10a, 10b protrude beyond the plane of the base of the support module 2. The offset body 18 in turn extends from the body 4. In particular, the offset body 18 extends from the first short end 11. The projections 10a, 10b are thereby offset from the body 4. The projections 10a, 10b assist in locating the support module 2 but are not placed under any significant loading in use. This is because the projections 10a, 10b do not secure the support module 2 to the top deck. The securing is by way of fasteners or some other means, as discussed in more detail below. The projections 10a, 10b also prevent the support module 2 from being installed in an incorrect orientation. This will become apparent as illustrated in FIGS. 5 and 6. The projections 10a, 10b therefore provide a mistake-proofing, or poka-yoke style, functionality.

In the illustrated example, the projections 10a, 10b are of the form of clips. That is to say, the projections 10a, 10b extend downwardly and each incorporate a laterally extending portion. This can be seen in more detail in FIGS. 1c and 3.

Although the illustrated support module 2 incorporates two projections 10a, 10b, other arrangements may alternatively be used. For example, more than two projections may be incorporated. Alternatively, a single projection may be used. Alternative geometries of projections may be used. For example, the projections could instead be pegs or another geometry. The illustrated projections 10a, 10b extend vertically. However, the projections may extend at an angle from the vertical. The projections may extend substantially vertically.

The two long sides 13, 14 each incorporate two teeth 23a, 23b, 24a, 24b and a rounded projection 26, 27. These may be collectively referred to as inwardly facing projections. Throughout this document, inward is used to refer to a direction which extends towards the opening 6 from the body 4. In other words, inward refers to a direction which extends towards an origin at a centre of the opening 6. Similarly, outward is used to refer to a direction which extends from the opening 6 towards the body 4.

The teeth 23a, 23b, 24a, 24b are inwardly tapering. That is to say, the teeth 23a, 23b, 24a, 24b are widest in proximity to the body 4, and narrow as they extend into the opening. A narrowest point of the teeth 23a, 23b, 24a, 24b is at a distance furthest away from the body 4. In other words, the teeth 23a, 23b, 24a, 24b are narrowest at a greatest extension into the opening 6.

The inwardly facing projections extend into the opening 6. As will be described in more detail below, the inwardly facing projections align with features of the pallet supports of pallets stacked on the platform to constrain the pallets. The pallets are therefore constrained within the opening 6, and so the support module 2. In other words, the inwardly facing projections restrict movement of the pallet supports and so pallet.

A lower surface of each of the inwardly facing projections is flush with the lower surface 8 of the support module 2. As such, the inwardly facing projections form extensions of the lower surface 8, or base, of the support module 2. The lower surfaces of the inwardly facing projections thereby improve the robustness of the support module 2 by providing a greater surface area in abutment with the top deck. The lower surface of each of the inwardly facing projections may not be continuous. The lower surface of each inwardly facing projection may lie in the same plane as lower surfaces of bosses 5a-h and ribs of the support module 2.

The two long sides 13, 14 each incorporate a reduced height portion 13a, 14a respectively. The reduced height portions 13a, 14a are of a reduced height relative to heights of the first and second short ends 11, 12. The reduced height portions 13a, 14a are also flattened relative to the ends of the two long sides 13, 14. The reduced height portions 13a, 14a facilitate the entry of tines, or forks, into a stacked arrangement of pallets. For example, when used with a forklift or an automated racking system, the reduced height portions 13a, 14a provide positions of entry for the tines to be received in the stack. Pallets above the positions of entry can then be lifted from the stack. This is shown in more detail in FIG. 4.

The reduced height portions 13a, 14a may be at least around 80 mm long. The reduced height portions 13a, 14a being at least around 80 mm long provides sufficient clearance for entry of tines or forks. The reduced height portions 13a, 14a may be at least around 100 mm long. The reduced height portions 13a, 14a may be at least around 10 mm wide.

The upper sections of the two long sides 13, 14 (i.e. the non-reduced height portions) narrow to an edge 15a, 15b, 17a, 17b of reduced width in an upper region. By narrowing to the edges 15a, 15b, 17a, 17b, an area available for receipt of a pallet support is increased in the upper region of the support module 2. The upper sections of the two long sides 13, 14 may be separated by at least around 140 mm. The at least 140 mm offset provides clearance for entry of a tine or fork. More preferably the upper sections of the two long sides 13, 14 may be offset by at least around 160 mm. The edges 15a, 15b, 17a, 17b also define guiding surfaces 15c, 15d (not visible in FIG. 1a), 17c, 17d. The guiding surfaces 15c, 15d, 17c, 17d provide a funnelling, or guiding, functionality whereby the pallet supports are guided towards their correct alignment. This is due to the tapering nature of the guiding surfaces 15c, 15d, 17c, 17d. The guiding surfaces 15c, 15d, 17c, 17d may therefore otherwise be referred to as tapering surfaces. The guiding surfaces 15c, 15d, 17c, 17d enable the support module 2 to correct an off-centering error when a pallet is stacked onto the platform in an off-centre position. For example, if the pallet is lowered onto the platform in a position which is not correctly aligned, the pallet supports will abut guiding surfaces 15c, 15d, 17c, 17d. Guiding surfaces 15c, 15d, 17c, 17d will then guide the pallet supports to their correct position as the pallet continues to be lowered. The guiding surfaces 15c, 15d, 17c, 17d are inwardly tapered surfaces. The guiding surfaces 15c, 15d, 17c, 17d may further incorporate curvature to follow the contours of the surrounding geometry. The inner surface at ends of the body 4 therefore tapers inwardly.

An inner face 19 of the second short end 12 is at least partly arcuate. The inner face 19 has an arcuate region 19a formed of an arc with a radius greater than the other fillets in the support module 2. As such, the arcuate region 19a incorporates a gentle curvature. The arcuate region 19a is configured to receive a wheel of a dolly. As such, in use, the arcuate region 19a contacts an external surface of the wheel. The abutment of the wheel against the arcuate region 19a improves the stability of the stacked arrangement. The abutment may also guide the dolly, or wheeled pallet, into a correctly aligned position. This is described in greater detail below.

The arcuate region 19a is bounded by two end faces 19b (not visible in FIG. 1a), 19c. The end faces 19b, 19c are flat. The end faces 19b, 19c limit the movement of wheels in a direction normal to a direction of rolling. In other words, the end faces 19b, 19c and arcuate region 19a cooperate to limit movement of a wheel received in the support module 2.

A pair of internal curved surfaces 31a (not visible in FIG. 1a), 31b span a portion of the second short end 12 and a portion of one of the first long side 13 and second long side 14 respectively. The internal curved surfaces 31a, 31b adjoin the end faces 19b, 19c respectively. The internal curved surfaces 31a, 31b are configured to be abutted by square feet of a pallet stacked on the platform. The stacked pallet is made more stable as a result. The internal curved surfaces 31a, 31b also taper in a similar fashion to the guiding surfaces 15c, 15d, 17c, 17d. In other words, the offset between corresponding points on the internal curved surfaces 31a, 31b is greater in the upper region than in proximity to the lower surface 8. The internal curved surfaces 31a, 31b also therefore provide a funnelling or guiding functionality for the pallet support.

The first short end 11 also incorporates an inner face 21 (not visible in FIG. 1a) which, in use, abuts an external surface of a wheel received in the support module 2. The inner face 21 of the first short end 11 therefore also improves the stability of the stacked arrangement by limiting the movement of the wheel received in the support module 2, and corresponding pallet. The inner face 21 also guides the pallet support into a correctly aligned position.

The support module 2 includes two lugs 26a, 26b. The two lugs 26a, 26b facilitate stacking of a platform on top of the support module 2. The two lugs 26a, 26b are upwardly extending from an upper surface. When another platform is stacked on top, the lugs 26a, 26b will penetrate a lower deck of the stacked platform. This is shown in FIG. 5. As well as penetrating the lower deck, the lugs 26a, 26b will abut ribs in the lower deck, constraining the movement of the stacked platform as a result. The lower deck of the stacked platform may not be a continuous surface, and may be intermittent. That is to say, the lower deck may be a defined by ribs and other features. Lowermost surfaces of the ribs and other features may lie in a plane.

The lugs 26a, 26b extend from an upper platform 28a, 28b. The upper platform 28a, 28b spans a portion of the first long side 13, the second short end 12 and a portion of the second long side 14. The upper platform 28a, 28b is flat in the illustrated example. The upper platform 28a, 28b provides a surface upon which a lower deck of a platform stacked on the platform and support module 2 can rest. The lugs 26a, 26b may protrude by at least around 5 mm. Protrusion by at least around 5 mm allows enough contact between the lugs 26a, 26b and the lower deck of the stacked platform to provide stability. More specifically, the lugs 26a, 26b may, for example, protrude by around 10 mm.

The distance between an uppermost point of the lugs 26a, 26b and the lower surface 8 may be at least around 30 mm. The distance between the uppermost point of the lugs 26a, 26b and the lower surface 8 may be around 40 mm.

Although the support module 2 incorporates two lugs 26a, 26b, a single lug may be used. However, incorporation of two lugs 26a, 26b means that the same design of support module 2 can be used in the four different positions on the top deck. This is due to the plane of symmetry which exists through a centre, and along the long sides 13, 14, of the support module 2. The same applies to the inwardly facing projections and the first short end 11 projections 10a, 10b. More detail regarding the plane of symmetry is provided in connection with FIG. 2b.

The lugs 26a, 26b extend at least in part from the second short end 12. As illustrated, the lugs 26a, 26b each extend from the second short end 12 and then also extend partly from the first long side 13 and second long side 14 respectively. This allows the lugs 26a, 26b to extend upwardly and into the lower deck of a stacked platform. The lugs 26a, 26b extend vertically.

The lugs 26a, 26b are arcuate in form. The arcuate form of the lugs 26a, 26b facilitates their receipt by the lower deck of a stacked platform. This is due to an arrangement of ribs in the lower deck of the stacked platform (as shown in FIG. 5). An outer edge of lugs 26a, 26b follows an external geometry, or contours, of the body 4.

Whilst the lugs 26a, 26b and their exact arrangement are described in detail, it will be appreciated that alternative designs may be employed without departing from the functionality of the aforementioned lugs 26a, 26b. The lugs may be varied in terms of their number and geometry. For example, a single lug of the form of an elongate tab could alternatively be incorporated. Alternatively, a plurality of non-arcuate lugs could be used. The lugs may extend at an angle away from vertical. The lugs may extend substantially vertically. The position of the lugs may be changed. For example, the lugs could extend from one or more of the first short end 12a, first long side 14a and second long side 14b, or a combination thereof. Changes to the design of the lugs 26a, 26b may require corresponding modification of the lower deck of the platform which is to be stacked.

The lugs 26a, 26b may alternatively be referred to as projections.

The first short end 11 also incorporates an upper platform 29. The upper platform 29 is flat. In alternative arrangements, the upper platform 29 may be contoured, such as curved. The upper platform 29 provides a surface upon which the lower deck of a pallet stacked on the platform and support module 2 can rest.

The support module 2 may be at least around 90 mm wide. The support module 2 being at least around 90 mm wide allows the opening 6 to be wide enough to receive a pallet support, whilst maintaining the structural integrity of the support module 2. The support module may be around 100 mm wide. The support module 2 may be narrow enough that, when attached to the top deck 42, the support module 2 does not extend beyond a footprint of the top deck 42 when viewed from above.

The support module 2 may be at least around 260 mm long. The support module 2 being at least around 260 mm long allows the opening 6 to be long enough to receive a pallet support in multiple orientations. The support module 2 may be around 275 mm long. The support module 2 may be short enough that, when attached to the top deck 42, the support module 2 does not extend beyond a footprint of the top deck 42 when viewed from above.

The support module 2 may be at least around 30 mm in height, excluding the projections 10a, 10b. The support module 2 being at least around 30 mm in height allows the pallet support to be retained in the support module 2 such that stability is improved. The support module 2 may be short enough that lugs 26a, 26b do not contact the lower deck of a pallet or dolly stacked on the platform.

The aforementioned dimensions of the support module 2 may be varied depending upon the platform which the support module 2 is to be attached to.

Figure 1B:
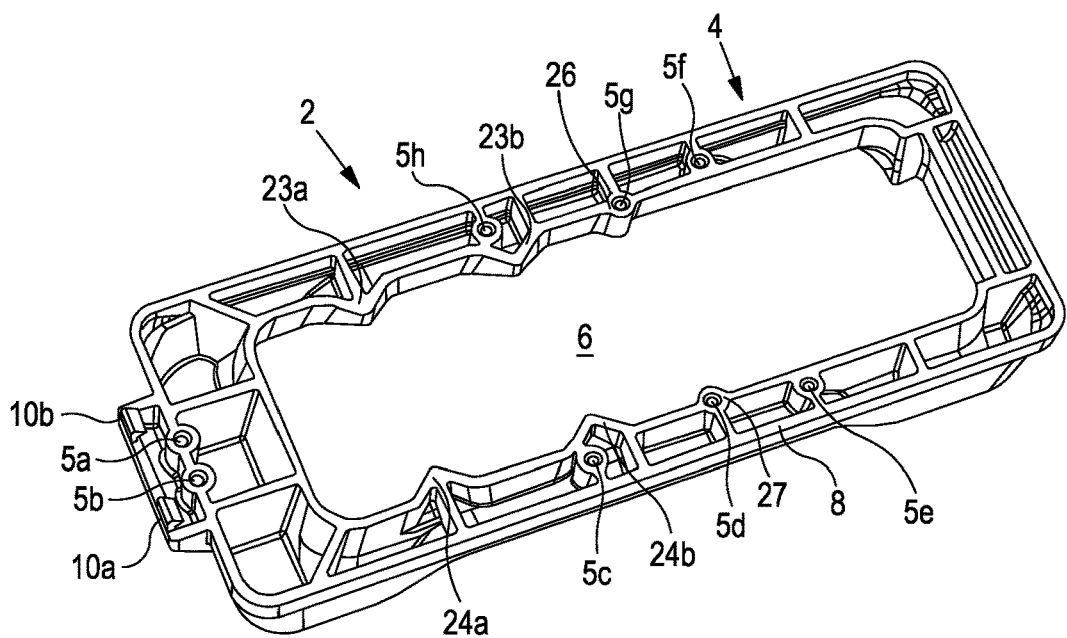
FIG. 1b is a perspective view of the support module of FIG. 1a from below.

FIG. 1b depicts a perspective view of the support module 2 from below. The generally hollow underside of the support module 2 is visible. Also visible is the lower surface 8. The lower surface 8 is defined by an outer face of a plurality of ribs which extend across otherwise hollowed regions of the body 4. The body 4 structure is generally defined by an inner wall which is separated from an outer wall by ribs. Upper ends of the inner and outer walls are connected by a surface. This provides a solid outer surface when the support module 2 is fitted to a platform (the lower surface is open but abuts the platform). Thicknesses of the inner and outer walls, and the ribs, may be at least around 2 mm. Thicknesses of at least around 2 mm may provide structural integrity whilst not unduly increasing the volume of material required to manufacture the support module 2 detrimentally.

The bosses 5a-h configured to receive fasteners are also visible in FIG. 1b. Similarly, the projections 10a, 10b and their laterally extending portions are also visible in FIG. 1b.

Figure 1C:
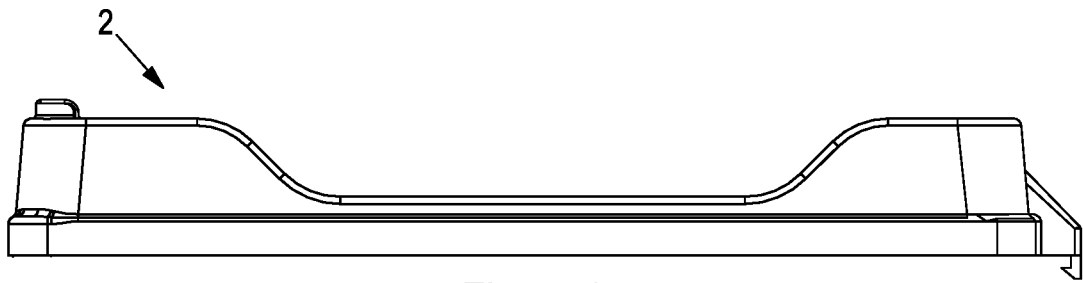
FIG. 1c is a side view of the support module of FIGS. 1a and 1b.

FIG. 1c depicts a side view of the support module 2.

Figure 1D:
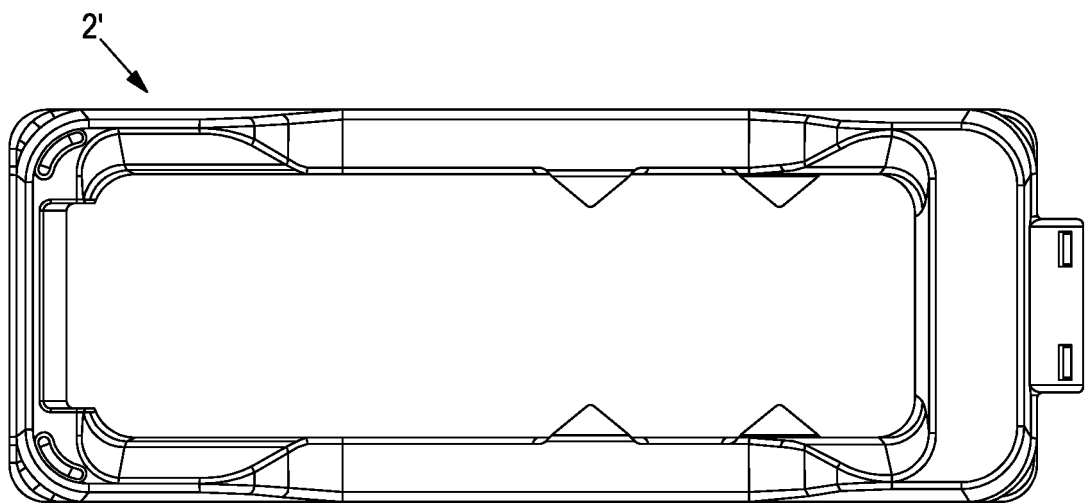
FIG. 1d is a plan view of a modified support module.
Figure 1E:
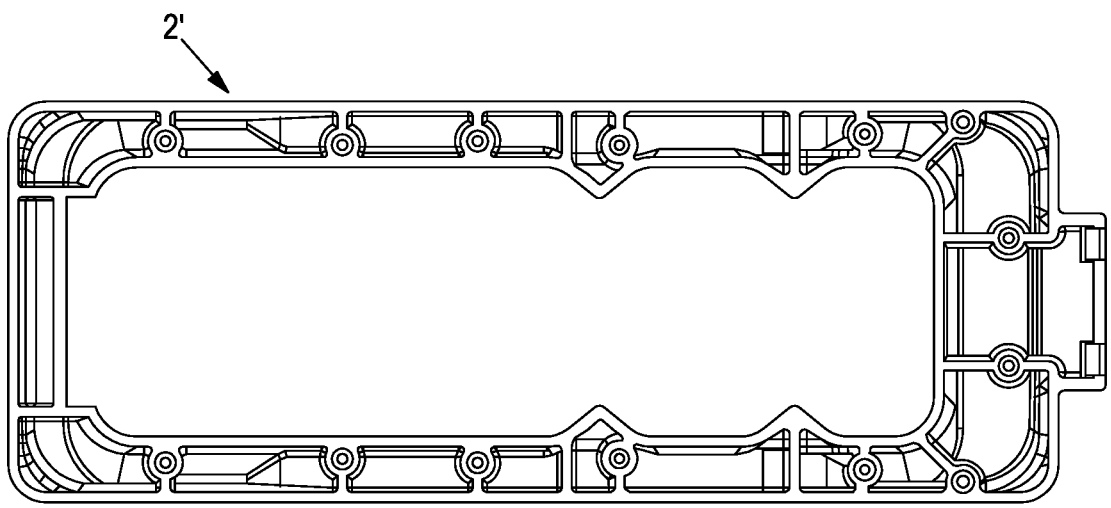
FIG. 1e is a view of the support module of FIG. 1d from below.

FIGS. 1d and 1e depict views from above and below respectively of a modified support module 2'. The modified support module 2' includes more bosses, a different rib arrangement and no nubs in comparison to the aforementioned support module 2. Otherwise, the modified support module 2' shares many of the features and functionalities of the support module 2 of FIGS. 1a-c.

Figure 2A:
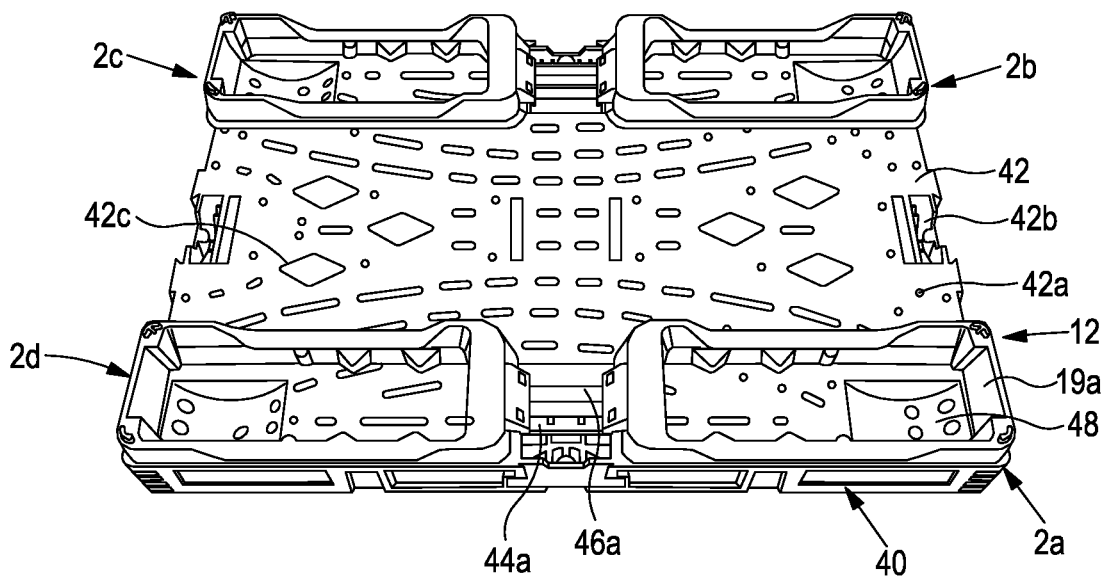
FIG. 2a is a perspective view of a platform with four of the support modules of FIGS. 1a-c attached.

FIG. 2a is a perspective view of a platform 40 with four support modules 2a-d fitted thereto. The platform 40 may be a slave pallet.

The platform 40 comprises a top deck 42. A variety of features such as drainage holes 42a, slots for receiving display tabs 42b, and a logo 42c are cut into the top deck 42. The features may otherwise be referred to as cut-outs.

The four support modules 2a-d are fitted to the top deck 42 such that respective lower surfaces of the support modules abut the top deck. As mentioned above, when the support modules 2a-d are attached, the projections 10a, 10b of each module are initially aligned with corresponding slots in the top deck 42. In particular, a display slot 44a and a hand hole 46a are the slots in which the projections 10a, 10b are received. Once aligned, fasteners are inserted through the top deck 42 and into the support modules 2a-d. The locations of the fasteners are shown in FIG. 2c. Due to the size of the hand hole 46a, the projection inserted in the hand hole 46a does not actually contact edges of the hand hole 46a. As such, the projection provides little, if any, locating functionality. It is the projection inserted into the display slot 44a which provides the constraining functionality. However, and as explained above in connection with the lugs 26a, 26b for facilitating stacking, the incorporation of two projections 10a, 10b means that the same design of support module 2 can be used in the four different positions on the top deck.

As shown in FIG. 2a, and with reference to a first support module 2a, the second short side 12 is adjacent one of two short sides of the top deck 42. Arcuate region 19a is positioned adjacent a wheel recess 48 of the top deck 42. The wheel recess 48 is, as suggested by the name, a recess cut into the top deck 42 for receipt of a fixed or caster wheel. The wheel recess 48 and arcuate region 12d cooperate to define geometry to receive, and limit travel of, a fixed or caster wheel.

Figure 2B:
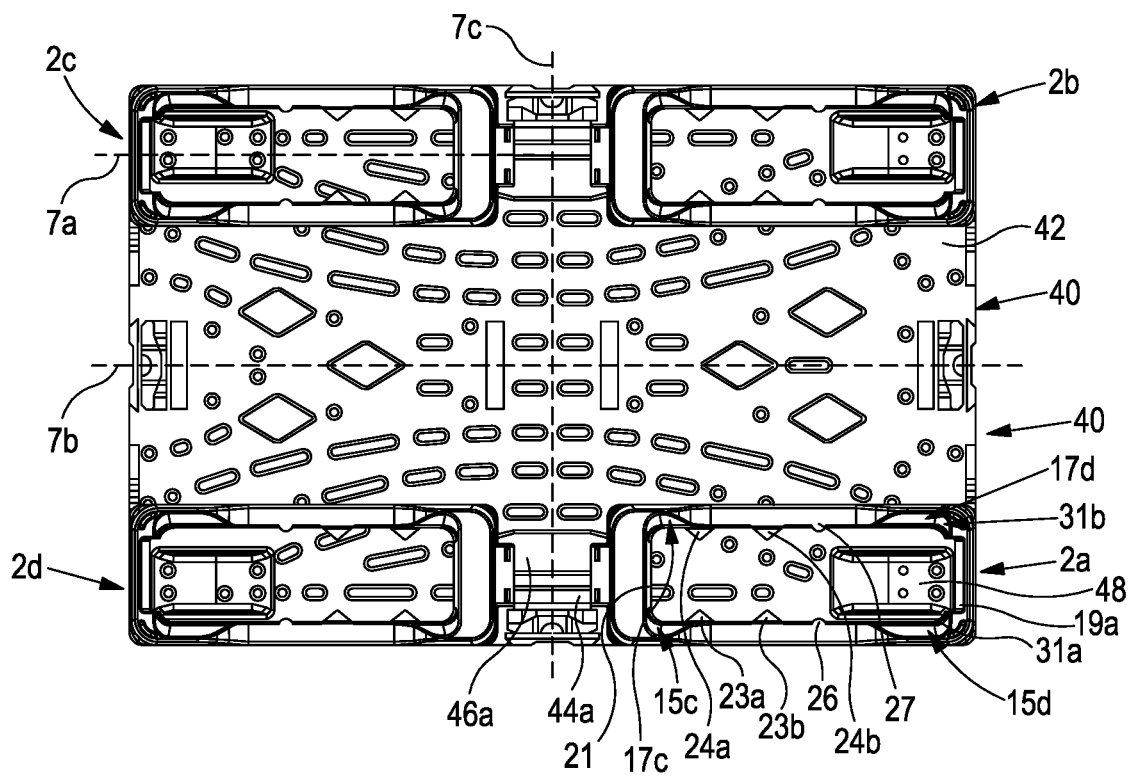
Figure 2C:
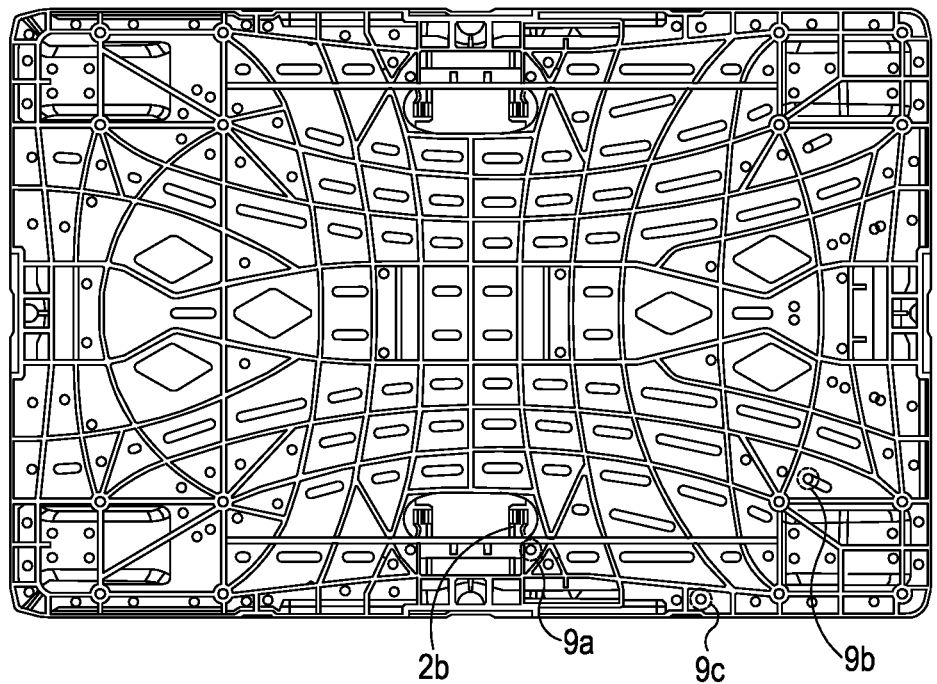
FIG. 2c is a view of the platform and support modules of FIGS. 2a and 2b from below.

FIG. 2b is a plan view of the platform 40 fitted with four support modules 2a-d. The four support modules 2a-d are each fitted in a corner of the top deck 42.

As can be seen from the plan view, outer edges of the support modules 2a-d are flush with outer edges of the top deck 42. As such, when viewed in plan, a single continuous outer edge defines an outer footprint of the top deck 42 and the support modules 2a-d. The risk of damage to the support modules 2a-d by impact or similar is therefore reduced in comparison to an arrangement whereby outer edges of the support modules project outwards of the outer edges of the top deck 42. The retrofitting of the support modules 2a-d does not affect the plan geometry of the platform 40 and so modifications required to use the modified platforms with existing machinery are reduced or eliminated. The flush alignment of the outer edges is also beneficial because the size of the support modules 2a-d does not need to be reduced. Reducing the size of the support modules 2a-d may negatively impact the ability of the support modules 2a-d to stabilise pallets stacked on the platform.

FIG. 2b also illustrates how the wheel recesses 48 and arcuate regions 19a cooperate to receive the fixed or caster wheel of a stacked pallet. The surfaces can be seen to form a substantially continuous guiding surface which is contoured to match an outer surface of the wheel. A small lip exists between an edge of the wheel recess 48 and an edge of the arcuate region 19a. Inwardly facing projections 23a, 23b, 24a, 24b, 26, 27 and inner face 21 of the second short end 12, which define a guide for a wide foot of a pallet stacked on the platform, are also shown. Finally, guiding surfaces 15c, 15d, 17c, 17d and curved surfaces 31a, 31b are also visible. The aforementioned projections, faces and surface guide entry of a pallet support of a pallet stacked on the platform. The aforementioned projections, faces and surface also constrain the movement of a pallet support of a pallet stacked on the platform. The plan view demonstrates how the guiding surfaces 15c, 15d, 17c, 17d, arcuate region 19a, inner face 21 and curved surfaces 31a, 31b converge toward the opening 6, thereby guiding the pallet support into position. In particular, and as shown in FIGS. 6a-7b, the guiding surfaces 15c, 15d, 17c, 17d, arcuate region 19a, inner face 21 and curved surfaces 31a, 31b guide the feet 66a-b, 68a-b toward the inwardly facing projections. Similarly, guiding surfaces 15d, 17d, arcuate region 19a and curved surfaces 31a, 31b guide the wheels 58a-b, 59, 60 toward the wheel recesses 48. These features therefore provide the functionality of correcting misalignment of the pallet, and so pallet supports, when the pallet is lowered or stacked onto the platform 40. Once the pallet support is received in the correctly aligned position, a corresponding unit load placed on the pallet is also secured in position.

The approximate position of projections 10a, 10b (not visible in FIG. 2b) of the support modules 2a-d in the slots 44a, 46a is indicated in FIGS. 5 and 6. As mentioned above, the projections 10a, 10b are not tightly constrained by the hand hole 46a. As such, only the outermost projection will provide the locating functionality. This is due to the innermost projection being located in the oversized hand slot 46a. In the illustrated example, the projections 10a, 10b are partially cuboidal. That is to say, the projections 10a, 10b have flat outer faces in contact with the slots 44a, 46a. The outer dimensions of the projections 10a, 10b are selected to be received in the slot 44a. As such, the receipt of one of the projections 10a, 10b in the slot 44a constrains, or restricts, the movement of the support module 2a-d. Three outer faces of the outer projection are configured to abut three corresponding internal faces of the slot 44a in use. Furthermore, the laterally extending portion of the projection 10a also locates the support module 2 on the top deck. The laterally extending portion achieves this by preventing the support module 2 from being directly lifted off of the top deck 42. The support module 2 must instead be slid across the top deck 42 to expose the laterally extending portion. The support module 2 can then be lifted off of the top deck 42. It will be understood that the above refers to situations where fasteners are not in place.

When the support modules 2a-d are fitted to the platform 40, the projections 10a, 10b are initially located in the slots 44a, 46a in the top deck 42. With the projections 10a, 10b in the slots 44a, 46a, the position of the support module 2a-d on the top deck is constrained. That is to say, movement of the support module 2 is thereby limited. The support module 2a-d is then secured to the top deck 42 in the correctly aligned position using fasteners or another suitable securing means. FIG. 2c shows the positions in which fasteners can be secured through the top deck and into the bosses 5a-h. In a specific example, three screws may be used to secure the support module 2a-d to the top deck 42. Alternatively, retaining clips could extend from the support module 2a-d and clip into the top deck 42 to secure the support module 2a-d. Retaining clips may provide both locating and securing functionality. Retaining clips may be of the form of a downwardly projecting tab with a laterally extending tip.

Planes of symmetry 7a-c through the individual support module 2c and the combination of the platform 40 and the support modules 2a-d are indicated in FIG. 2b. A first plane of symmetry 7a exists through the support module 2c. This plane of symmetry 7a passes through midpoints of the short ends of the support module 2c. The plane of symmetry may be normal to the lower surface 8 of the support module 2. Two further planes of symmetry 7b, 7c exist through the platform 40 and the support modules 2a-d. A second plane of symmetry 7b passes through midpoints of short ends of the platform 40 and is normal to the top deck 42. A third plane of symmetry 7c passes through midpoints of long ends of the platform 40 and is normal to the top deck 42.

The first plane of symmetry 7a allows the same design of support module 2 to be used in the four positions on the top deck 42. The combination of the second and third planes of symmetry 7b, 7c means that pallets can be stacked on the platform 40 in either one of two orientations. The planes of symmetry 7a-c therefore represent significant advantages in the both the assembly, and use of, the platform 40 and support modules 2a-c.

FIG. 2c is a view of the platform 40 from beneath with four support modules 2a-d attached. In FIG. 2c no fasteners are shown, but the positions where fasteners would secure the support module 2b are indicated with dashed lines and labelled 9a-c. Positions 9a-c are positions on the top deck 42 of the platform whereby cut-outs align with bosses 5a-h in the lower surface of the support module 2b. As such, fasteners inserted through the underside of the top deck 42 in positions 9a-c will cut into corresponding bosses and secure the support module 2b in position. There are surplus bosses 5a-h in the support modules 2a-d which will not be used. However, and as explained above, the plane of symmetry through the support modules 2a-d allows the same design to be used for all four top deck locations of support modules.

Figure 3:
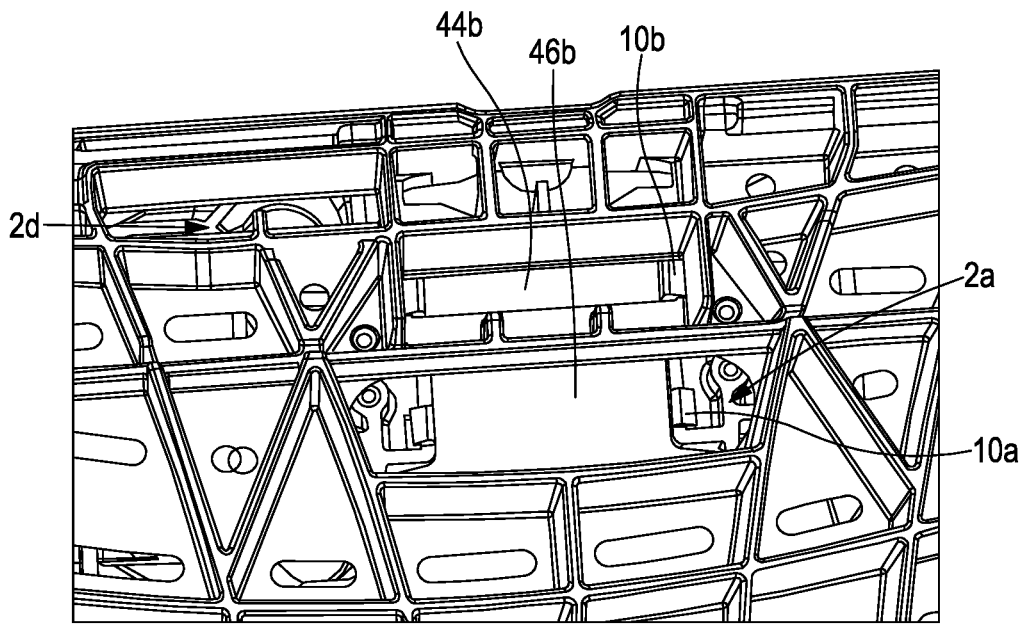
FIG. 3 is a close-up perspective view of projections of the support modules of FIG. 5 being received in slots of the platform.

FIG. 3 is a close-up perspective view of the top deck 42 from below. Two support modules 2a, 2d are shown located on the top deck 42. FIG. 3 shows the projection 10b received in slot 44b. The laterally extending portion of projection 10b is also shown. The laterally extending portion grips an underside of the top deck 42 at a short end of the slot 44b.

In order to align the support module 2a, the projection 10b is inserted through the slot 44b. The support module 2a is then moved along the top deck 42 in a direction parallel to a major length of the slot 44b. The projection 10b will then abut the short end of the slot 44b. Upon abutment, the projection 10b will grip the underside of the top deck 42. The support module 2a is then correctly aligned. In other words, bosses align with cut-outs in the top deck for receipt of a fastener therethrough.

Also indicated in FIG. 3 is the lack of locating functionality provided by projection 10a in slot 46b.

Figure 4:
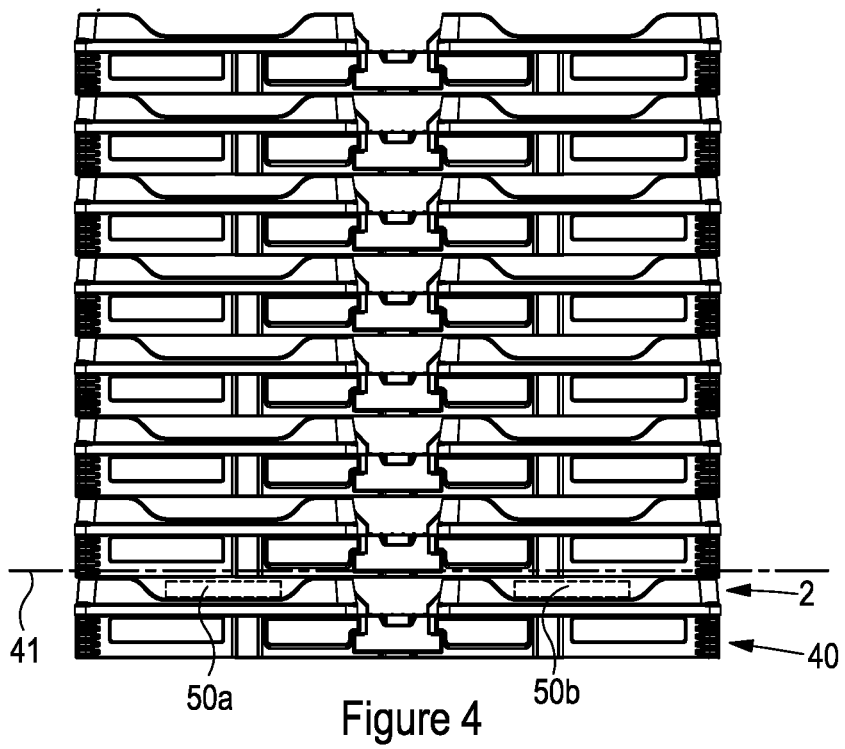
FIG. 4 is a side view of eight of the platforms and support modules of FIGS. 2a-c stacked upon one another.

FIG. 4 is a side view of a stack of eight platforms 40, each of which is fitted with four support modules 2. The alignment of the stacked platforms 40 can be seen. As described above, the lower deck of the stacked platform rests on upper platforms of the support modules fitted to the platform below. Lugs of the support modules penetrate the lower deck to facilitate the stacking and improve stability. FIG. 4 also schematically illustrates two positions of entry 50a, 50b for tines of a forklift or automated racking system. The positions of entry 50a, 50b are defined by the reduced height portions of the support modules.

Also indicated in FIG. 4 is a plane 41 through which the cross-section view of FIG. 5 is taken.

FIG. 5 shows a cross-section view from above through the plane 41. FIG. 5 shows how the lugs 26a, 26b facilitate stacking of a further platform on top of the platform 40. As shown for support module 2a, an outer lug 26b is in more contact with the stacked platform than an inner lug 26a. In other words, outer lug 26b provides most of the locating functionality. In particular, there is more contact between the outer lug 26b and ribs in the lower deck of the stacked platform than between the inner lug 26a and ribs in the lower deck of the stacked platform. The functionality of the arcuate nature of the lugs 26a, 26b is also demonstrated in FIG. 5. In particular, the ribs in the lower deck are also arcuate. As such, the arcuate lugs 26a, 26b allow more surface contact area between the lugs 26a, 26b and the ribs.

When the support module 2 is located in situ, the support module 2 and constituent features provide a guide for a pallet support of a pallet stacked on the platform. This is described and illustrated in connection with FIGS. 9a-10b.

Figure 6A:
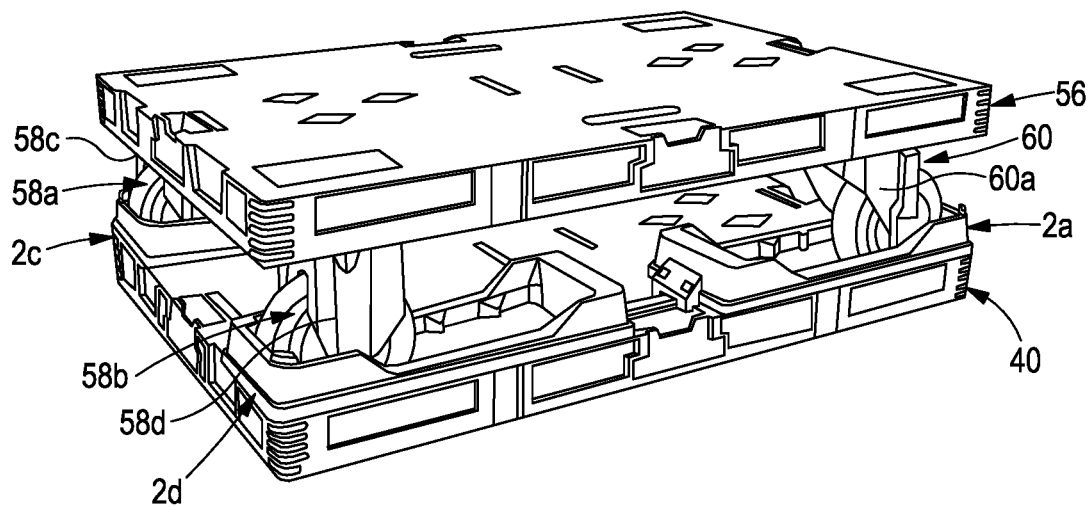
FIG. 6a is a perspective view of the platform and support modules of FIGS. 2a-c with a dolly stacked on the platform in a first orientation.

FIG. 6a is a perspective view of the platform 40 fitted with four support modules 2a, 2b (not visible in FIG. 6a), 2c, 2d and with a dolly 56 stacked on the platform 40. Dolly 56 comprises two fixed wheels 58a, 58b, and two caster wheels 59 (not visible in FIG. 6a), 60. One of the caster wheels 59 has a brake. The dolly 56 is in a first orientation in FIG. 6a. The dolly 56 is also in a properly stacked configuration in FIG. 6a, whereby the wheels 58a, 58b, 59, 60 are received in the wheel recesses and outer edges of the wheels abut arcuate regions of the support modules 2a-d. Each of the wheels 58a, 58b, 59, 60 comprises a cradle 58c, 58d, 59a (not visible in FIG. 6a), 60a. The cradles 58c, 58d, 59a, 60a facilitate the mounting of the wheels, and can provide functionality such as directional rotation of the caster wheels.

Figure 6B:
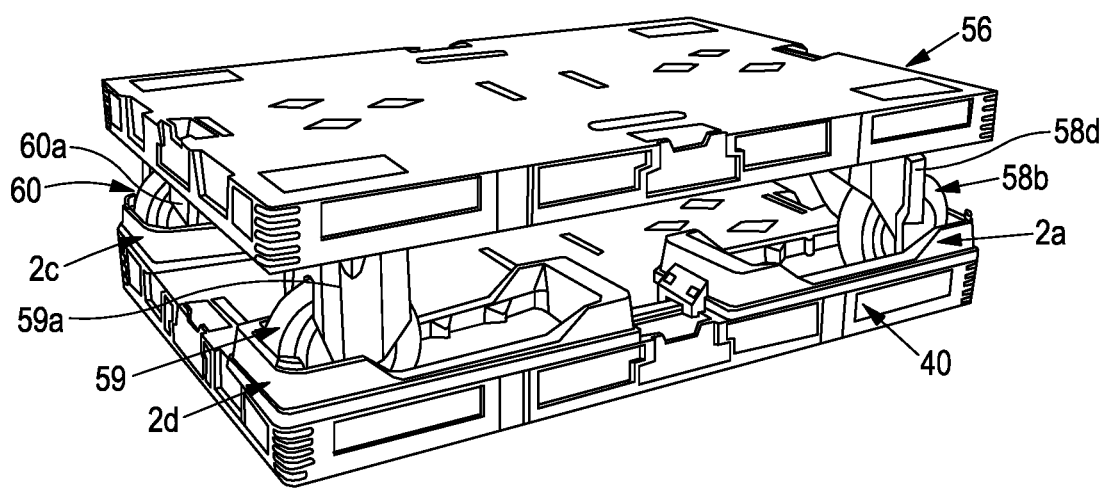
FIG. 6b is a perspective view of the arrangement of FIG. 6a with the dolly in a second orientation.
Figure 6C:
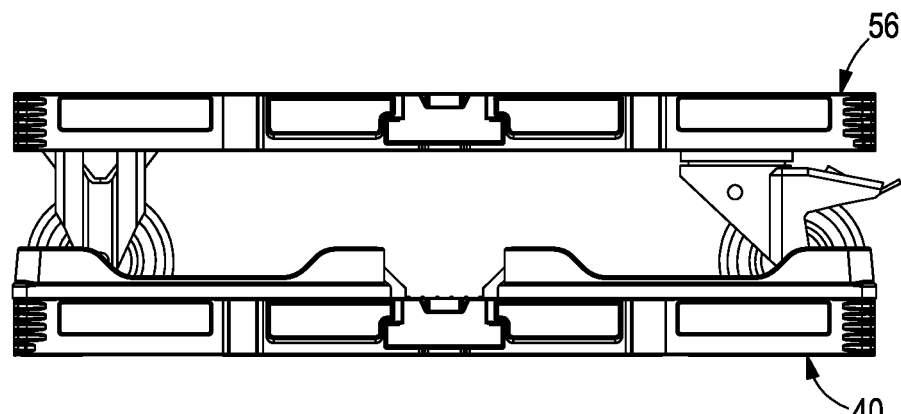
FIG. 6c is a side view of the arrangement of FIGS. 6a and 6b.

FIG. 6b shows the dolly 56 in a second orientation. The support modules 2a-d prevent the dolly 56 from rolling off of the platform 40. As mentioned above, the support modules 2a-d also assist with guiding the wheels of the dolly 56 into the corresponding wheel recesses in the platform 40.

Figure 7A:
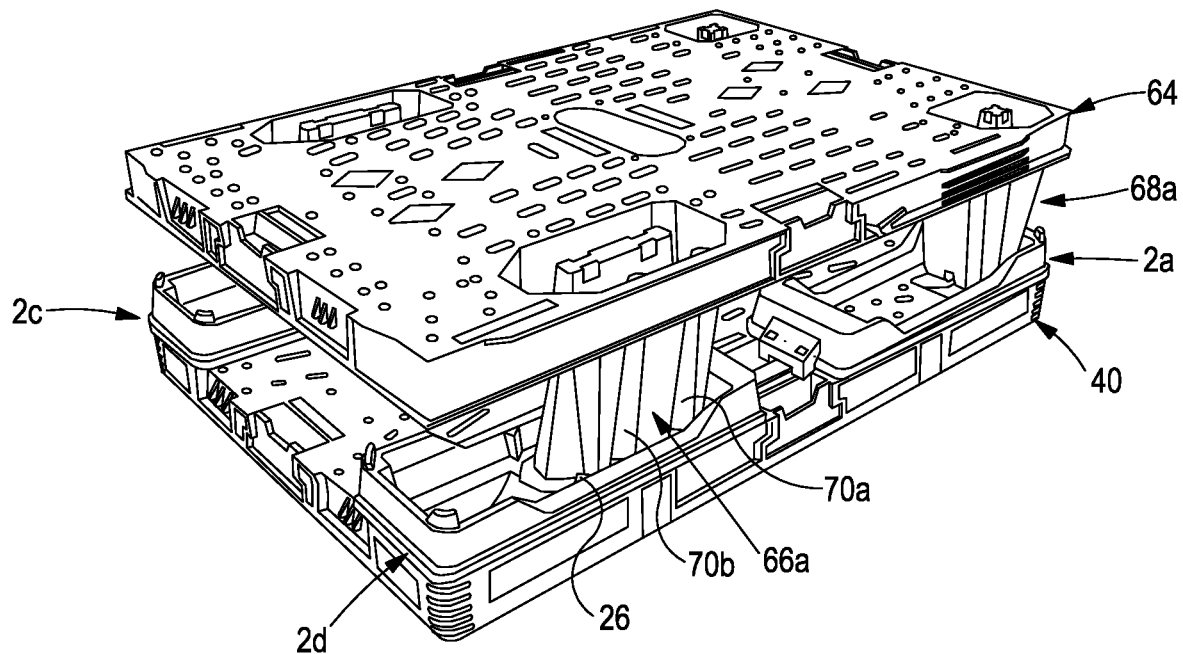
FIG. 7a is a perspective view of the platform and support modules of FIGS. 2a-c with a pallet stacked on the platform in a first orientation.

FIG. 7a is a perspective view of the platform 40 fitted with four support modules 2a, 2b (not visible in FIG. 7a), 2c, 2d, and with a pallet 64 stacked on the platform 40. The pallet 64 comprises two wide feet 66a, 66b (not visible in FIG. 7a) and two square feet 68a, 68b (not visible in FIG. 7a). Each of the two wide feet 66a, 66b comprise a number of locating features. For a first wide foot 66a, the locating features include first and second grooves 70a, 70b and a recess (not visible in FIG. 7a). The teeth of the support module 2d align with the first and second grooves 70a, 70b such that the first wide foot 66a is constrained. Furthermore, the rounded projection 26 of the support module 2d abuts the recess (not visible) to further constrain the first wide foot 66a.

An outer face of each of the square feet 68a, 68b abuts the corresponding internal curved surfaces 31a, 31b of the support modules 2a, 2b in proximity to the lower surfaces 8 of the support modules 2a, 2b.

The pallet 64 is thereby constrained in the correctly aligned position and stability of the stacked pallet 64 is improved as a result thereof.

Figure 7B:
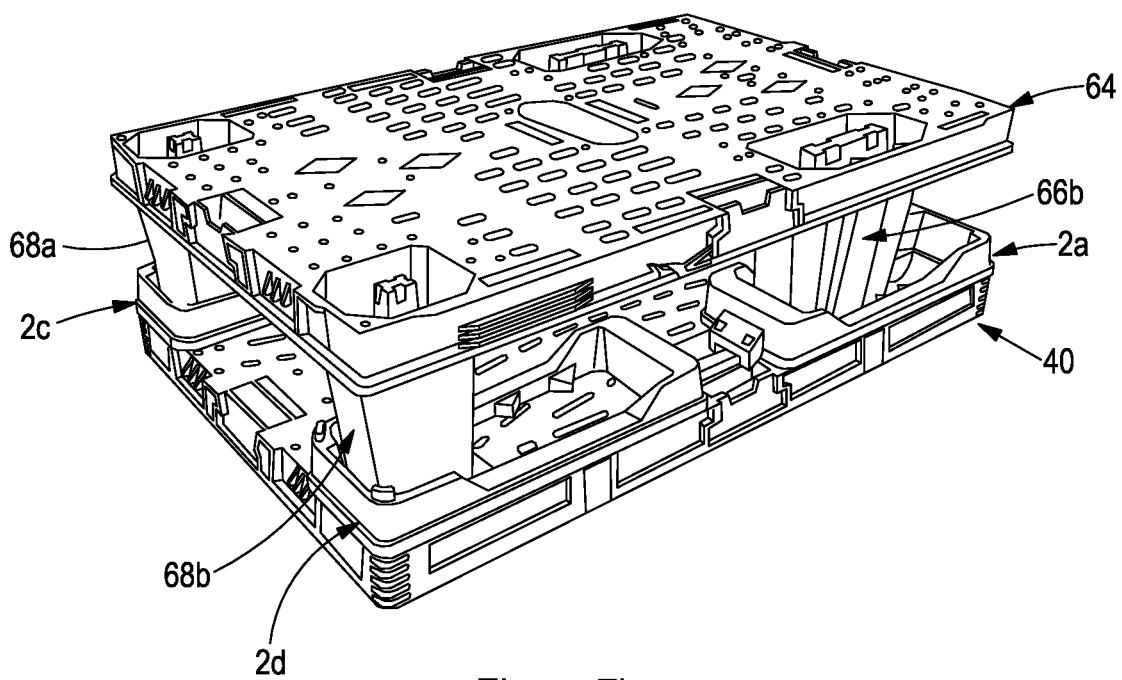
FIG. 7b is a perspective view of the arrangement of FIG. 7a with the pallet in a second orientation.

FIG. 7b shows the pallet 64 in a second orientation. Other than for the change of orientation, the arrangement is exactly the same as that shown in FIG. 7a.

FIGS. 9a-10b demonstrate how the support modules 2 can receive the dolly 56 or pallet 64 in either orientation.

Figure 8A:
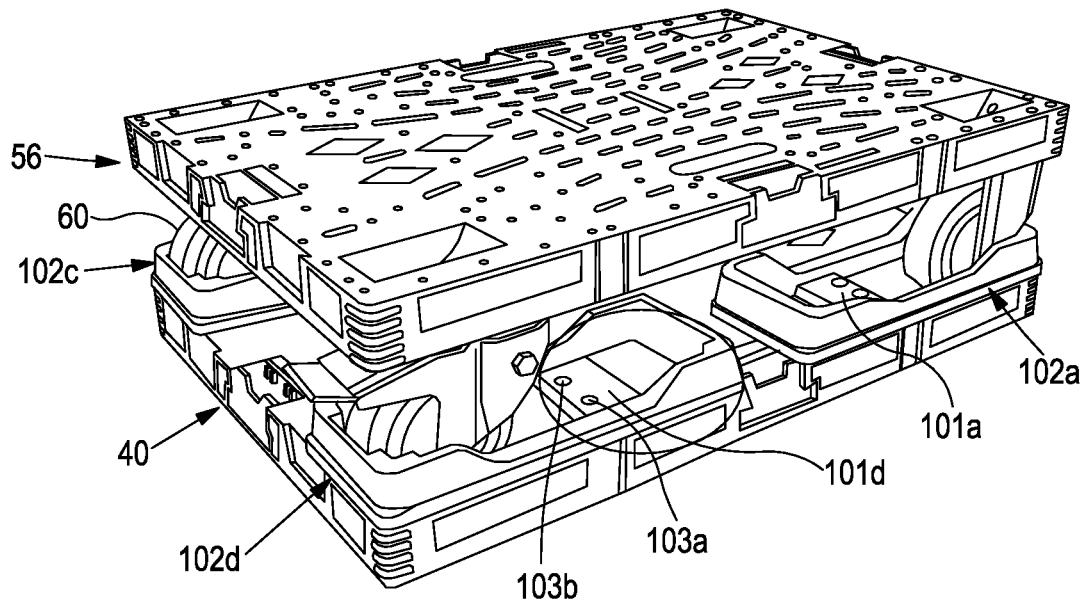
FIG. 8a is a perspective view of the platform with four support modules according to an alternative embodiment, with a dolly stacked on the platform.

FIG. 8a is a perspective view of the platform 40 with four support modules 102a, 102b (not visible in FIG. 8a), 102c, 102d, according to an alternative embodiment of the invention, attached. A dolly 46 is shown stacked on the platform 40.

The four support modules 102a-d share many features in common with the first embodiment. Reference numerals corresponding to like features are incremented by 100.

A principal difference between the first and second embodiments is the inclusion of fixing members 101a, 101b (not visible in FIG. 8a), 101c (not visible in FIG. 8a), 101d in the support modules 102a-d. The fixing members 101a-d may collectively be referred to as fixing members 101. The fixing members 101 divide the openings 6 in two. The fixing members 101 connect the first and second long sides 13, 14. The purpose of the fixing members 101 is to provide a convenient means to attach the support modules 102a-d to the top deck of the platform 40 from above. Fasteners are passed through bores 103a, 103b in the fixing members 101 to attach the modules to the top deck.

The support modules 102a-d also do not incorporate projections to facilitate the location of the modules in the top deck, nor lugs to facilitate stacking. Similarly, no offset body, and no thinner short end, is incorporated. Otherwise, the features and function of the support modules 102a-d are similar to that of the support modules 2 according to the first embodiment. In particular, the support modules 102a-d incorporate an arcuate region, an inner face, curved inner surfaces and guiding surfaces. The support modules 102a-d provide guiding and constraining functionality to pallet supports received in the support modules 102a-d. However, the omission of features such as the projections means that the support modules 102a-d may be more difficult to align correctly on the top deck 42.

Figure 8B:
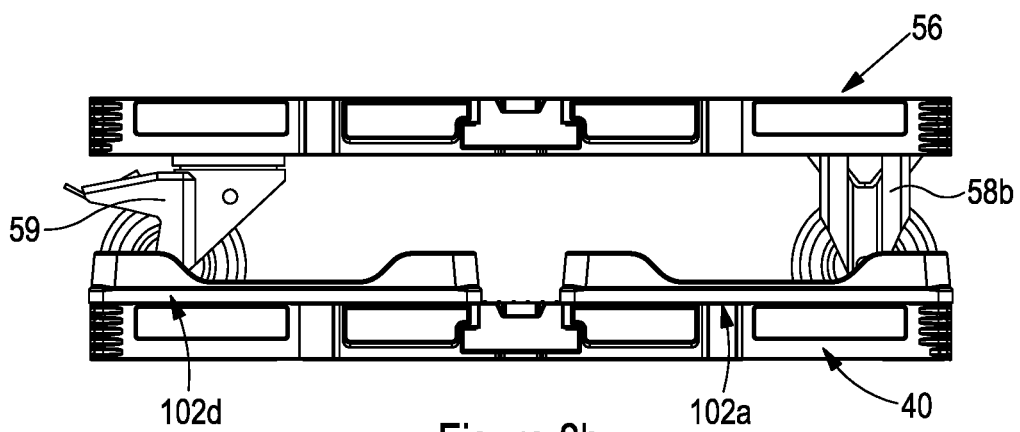

FIG. 8b is a side view of the arrangement of FIG. 8a.

Figure 9:
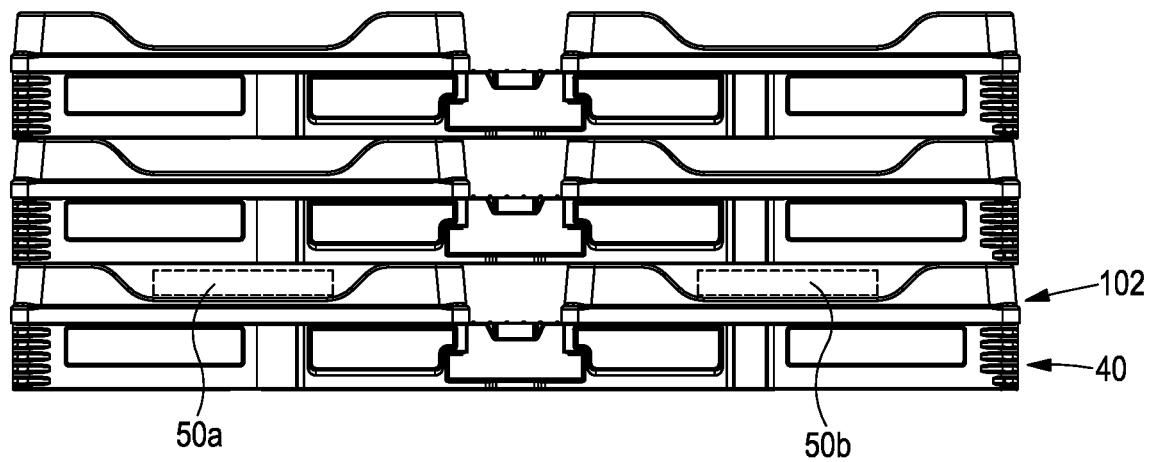
FIG. 9 is a side view of three of the platforms with support modules, of FIGS. 8a and 8b, stacked upon one another.

FIG. 9 is a side view of three platforms 40 with support modules 102 attached. Positions of entry 50a, 50b for tines of a forklift or automated racking system are also indicated.

In an alternative embodiment, the support modules may be recessed into the top deck instead of being attached to the top deck of the platform. Such recessed 'modules' may be referred to as recessed supports. Material may be removed from the top deck to replicate the features of, and functionality provided by, the support modules. The recessed supports may be used in conjunction with, or in place of, wheel recesses in the top deck. The alternative embodiment is schematically shown in FIG. 10.

Figure 10:
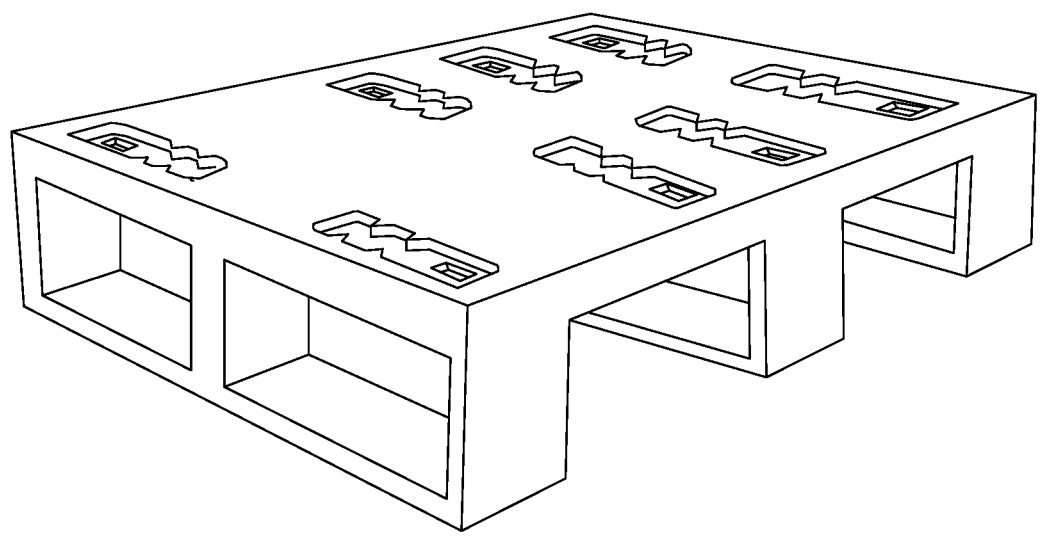
FIG. 10 is a schematic illustration of a platform provided with supports, and eight support modules recessed into the top deck

FIG. 10 schematically illustrates a slave pallet which comprises a platform provided with supports. Specifically, the platform is in the form of a half pallet with eight recessed supports in a top deck of the half pallet. The half pallet may be referred to as a half display pallet. The eight recessed supports are arranged in a 2×4 arrangement. As such, two quarter pallets can be stacked on the platform. A wheel receiving recess is also shown in each recessed support. Although referred to herein as a slave pallet, the pallet may be used for a variety of different applications such as supporting goods or products (i.e. the pallet is not intended for use solely to transport quarter pallets).

The recessed supports may be modified in comparison to the support modules. For example, the recessed supports may have an internal geometry of the support modules 2. That is to say, a perimeter of a cavity of the recessed module may correspond with an internal perimeter of the opening 6 of the support module 2. The recessed supports may also be of a reduced height relative to the counterpart support modules. This is due to the available thickness of top deck of the platform from which material can be removed.

In such an embodiment, the perimeter is recessed in the top deck. The perimeter defines the cavity for receipt of a pallet support. The recessed supports may incorporate any features of the support modules 2, 102 described above. That is to say, any features described in connection with the support modules 2, 102 may be transposed to the recessed supports. For example, inwardly projecting features to constrain the pallet support may be incorporated. Similarly, the guiding surfaces, internal curved surfaces, inner face and arcuate region may all be incorporated in the support. Alternatively, some or all of the above features, and other features described in connection with the support modules 2, may be omitted from the supports.

The recessed arrangement of the supports provides a number of advantages including reducing the height of the slave pallet in comparison to the height of a slave pallet when fitted with the support modules.

Figure 11:
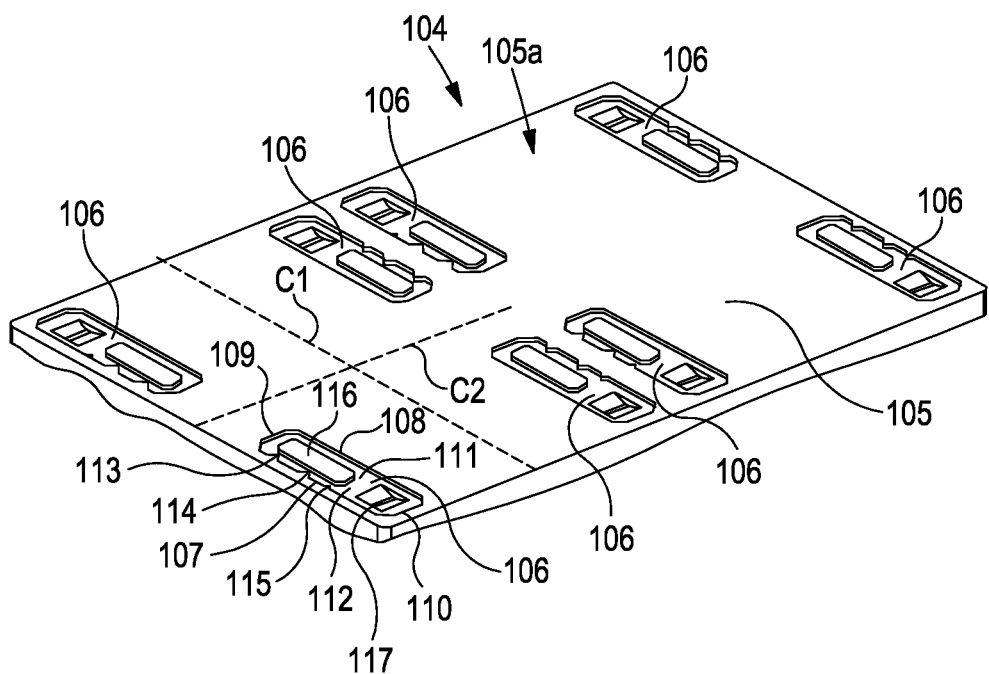
FIG. 11 is a schematic illustration of a platform having eight support modules recessed into the top deck.

FIG. 11 shows a more detailed perspective view of a top deck 105a of the platform 105 of the slave pallet 104 according to the alternative embodiment described with reference to FIG. 10. As with the support module 2, recessed supports 106 in the top deck 105a are elongate and comprise two long sides 107, 108 and two short ends 109, 110, defining an opening 111.

As with opening 6 described above, opening 111 is configured to receive a pallet support. Examples of pallet supports are feet and wheels. The wheels may be fixed wheels or caster wheels. The recessed support 106 comprises a lower surface 112 onto which a pallet support may be received.

The long side 107 and short end 110 are located outboard and the long side 108 and short end 109 are located inboard, where an inboard side or end is located closer to central axes C1, C2 of a pallet to be supported by the platform 105 than an outboard side or end.

The opening 111 may be at least around 60 mm wide at the lower surface 112. The at least around 60 mm is intended to refer to a distance between parallel portions of the opening 111, excluding any inwardly facing projections (as described below). The opening 111 being at least around 60 mm wide facilitates receipt of pallet supports of quarter pallets in the opening 111.

The opening 111 may be at least around 200 mm long at the lower surface 112. The opening 111 being at least around 200 mm long at the lower surface 112 facilitates receipt of the feet of quarter pallets in one of two orientations in the opening 111.

The long side 107 incorporates two teeth 113, 114, and a rounded projection 115 in a similar manner to teeth 24a, 24b and rounded projection 27 of support module 2. The teeth 113, 114 are inwardly tapering. That is to say, the teeth 113, 114 are widest in proximity to the long side 107, and narrow as they extend into the opening 111. A narrowest point of the teeth 113, 114 is at a distance furthest away from the long side 107. In other words, the teeth 113, 114 are narrowest at a greatest extension into the opening 111. The two teeth 113, 114, and the rounded projection 115 perform the same function as the teeth 24a, 24b and rounded projection 27 of support module 2 described above.

The recessed supports 106 comprise a raised portion 116 which extends from the lower surface 112. The raised portion 116 extends such that it is flush with the top deck of the platform 105. The raised portion 116 is configured to enter an opening (not shown) of pallet support. For example, in the case where the pallet support is a foot, the foot may have an opening in its bottom in which the raised portion 116 may enter when the pallet support is placed upon the recessed support 106. The raised portion 116 is shaped so as to match the shape of the opening on the foot of the pallet. The size and shape of the raised portion 116 may be such that the fit of the raised portion 116 within the foot prevents lateral movement of the foot with respect to the raised portion 116. That is, lateral movement between the slave pallet 104 and the pallet supported by the slave pallet 104 is restricted. This increases the stability of the pallet, or stack of pallets loaded onto the slave pallet 104.

The recessed supports 106 comprise a wheel recess 117. The wheel recess 117 is configured to receive a wheel of a pallet in a similar manner as described with respect to wheel recess 48, described above.

While the recessed supports 106 are shown as having both a raised portion 116 and wheel recess 117, it will be appreciated that only one of these, or neither, may be present. However, it is advantageous to have both such that the slave pallet 104 may be used with pallets having either wheels or feet.

While only the outboard long side 107 is shown as having teeth 113, 114 and rounded projection 115, it will be appreciated that, as in the support module 2 described above, both long sides 107, 108 may have teeth and projections.

While not shown, the recessed support 106 may comprise a number of holes for drainage and aeration. The holes may be located on the lower surface 112, the raised portion 116 and or within the wheel recess 117.

Providing integral recesses in a slave pallet, such as the recessed supports 106, does not require the use of additional components or fixings. Additionally, the combined height of a dolly or pallet supported by the slave pallet 104 is lower in comparison to the combined height of a pallet when fitted with the support modules 2, since a portion of the dolly or pallet is located within the slave pallet 104.

The slave pallet 104 may have any suitable number of recessed supports 106. In the example shown, the slave pallet 104 has eight recessed supports 106. In another implementation, the slave pallet 104 may have four recessed supports 106. The slave pallet 104 may be a pallet or half pallet.

Figure 12A:
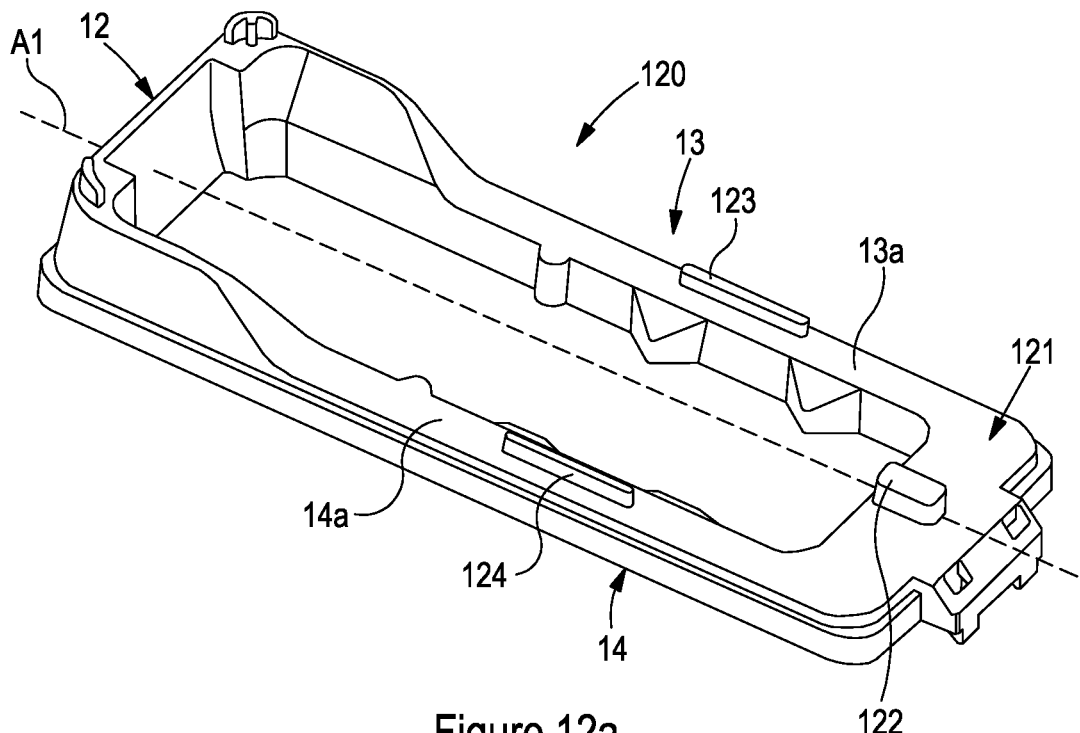
FIG. 12a is a perspective view of a support module according to an embodiment of the invention.
Figure 12B:
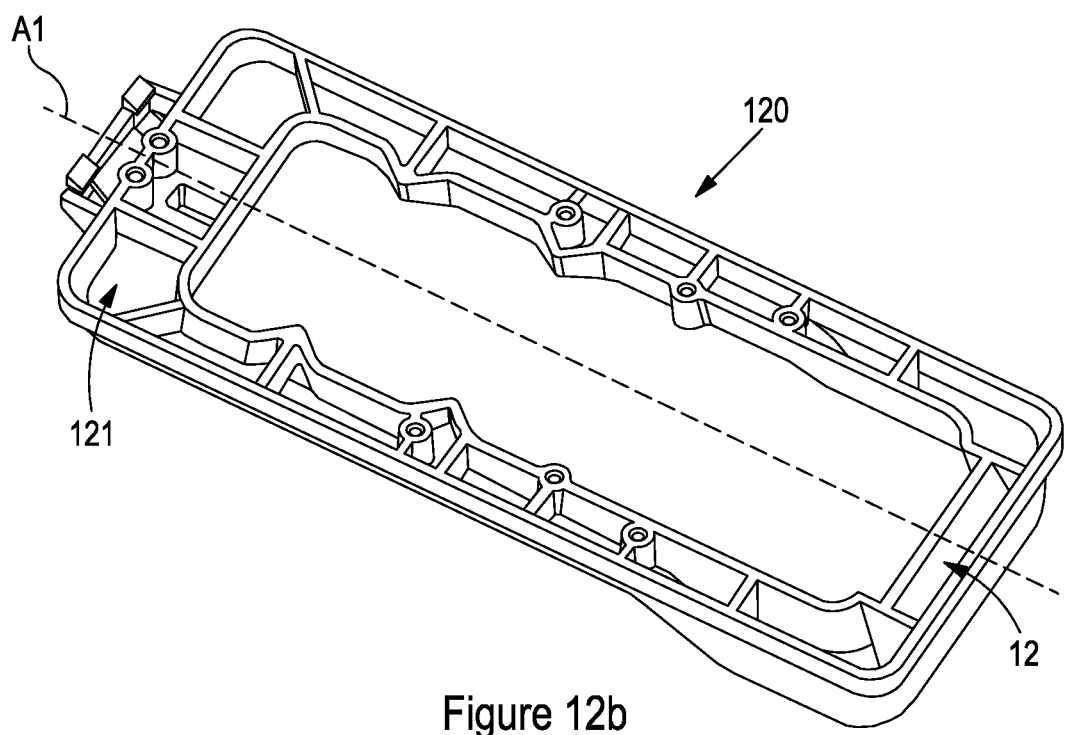

FIGS. 12a and 12b show an alternative support module 120. The alternative support module 120 is similar to that described above with reference to FIGS. 1a and 1b, where like for like features have been referenced using the same reference numerals. Not all features in FIGS. 12a and 12b, which also appear in FIGS. 1a and 1b, have been referenced in the figures. Additionally, the description of like for like features has not been described below as these features are described above.

Like the support module 2 described above and shown in FIGS. 1a and 1b the alternative support module 120 is generally elongate, having a major axis Al. The alternative support member 120 differs from the support member 2 in that the alternative support module 120 comprises an alternative first short end 121 which sits lower than the second short end 12. That is, the height of the first short end 121 is less than the height of the second short end 12. In the embodiment shown, the height of the first short end 121 is the same as the reduced height portions 13a, 14a of the two long sides 13, 14. The first short end 121 and the reduced height portions 13a, 14a of the two long sides 13, 14 provide a generally flat surface onto which a skid (such as skid 200 described below) may be supported.

The first short end 121 comprises a lug 122. The two long sides 13, 14 also each comprise a lug, 123, 124. The lugs 122, 123, 124 facilitate stacking of a platform having a skid (described below) on top of the support module 120. The lugs 122, 123, 124 are upwardly extending from an upper surface of the support module 120. When another platform having a skid is stacked on top of the support module 120, one or more of the lugs 122, 123, 124 penetrate one or more apertures of a supporting surface of the skid (as described below). As well as penetrating the supporting surface of the skid, the lugs 122, 123, 124 may abut against one or more sides of the apertures, constraining relative lateral movement between the stacked platforms.

The lugs 122, 123, 124 may protrude by at least around 3 mm. That is, the distance between an uppermost point of the lugs 122, 123, 124 and the surface from which they protrude may be at least around 3 mm. Protrusion by at least around 3 mm allows enough contact between the lugs 122, 123, 124 and the supporting surface of the skid to provide stability. In alternative arrangements, the lugs 122, 123, 124 may, for example, protrude by around 5 mm. In alternative arrangements, the lugs 122, 123, 124 may, for example, protrude by around 10 mm. The distance between an uppermost point of the lugs 122, 123, 124 and the lower surface 8 of the support module 120 may be at least 15 mm. In other implementations, the distance may be at least around 18 mm. In other implementations, the distance may be at least about 20 mm. While described as all having the same height, the lugs 122, 123, 124 may protrude by different heights.

The lugs 123, 124 extending from the first and second long sides 13, 14 are generally elongate and aligned parallel with the major axis Al of the support module 120, having a width smaller than the width of the lug 122 extending from the first short end 121, the width being perpendicular to the major axis Al of the support module 120. The lug 122 extending from the first short end 121 has a length smaller than the length of the lugs 123, 124 extending from the first and second long sides 13, 14, the length being parallel to the major axis A1 of the support module 120.

The distance between an uppermost point of the lugs 122, 123, 124 and the surface from which they protrude may be at least around 3 mm. The distance between an uppermost point of the lugs 122, 123, 124 and the lower surface 8 of the support module 120 may be at least 15 mm. In other implementations, the distance may be at least around 18 mm. In other implementations, the distance may be at least about 20 mm.

Although the support module 120 incorporates three lugs 122, 123, 124 for connecting to the skid, a single lug may be used. Alternatively, more than three lugs may be used.

The support module 120 is symmetrical about a plane of symmetry which passes through midpoints of the short ends 12, 121, with the lug 122 of the first short end 121 lying in the plane, and the lugs 123 and 124 being located on either side of the plane. The symmetry provided by the support module 120 allows, for example, a single configuration of the support module 120 to be manufactured, e.g. a single mould to be used to create the support module 120, but where the support module 120 can be used at either end of a platform. However, it will be appreciated that in other implementations, the support module 120 may not be symmetric about the plane.

Whilst the lugs 122, 123, 124 and their exact arrangement are described in detail, it will be appreciated that alternative designs may be employed without departing from the functionality of the aforementioned lugs 122, 123, 124. The lugs 122, 123, 124 may be varied in terms of their number and geometry. The lugs 122, 123, 124 may extend at an angle away from vertical. The lugs 122, 123, 124 may extend substantially vertically. The position of the lugs 122, 123, 124 may be changed. Changes to the design of the lugs 122, 123, 124 may require corresponding modification of the supporting surface of the skid attached to the platform which is to be stacked.

The lugs 122, 123, 124 may alternatively be referred to as projections.

With reference to FIGS. 13a to 22, there will now be described a skid 200 which can, in some implementations, be used with a platform having the support module 120 described above.

Figure 13A:
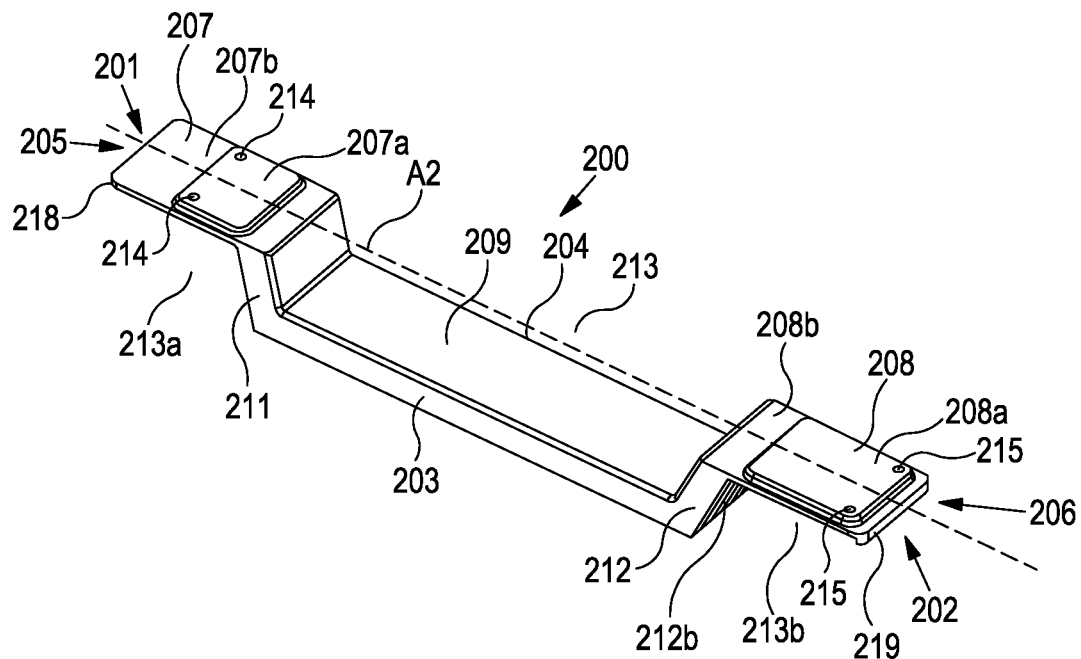
FIG. 13a is a perspective view of a skid according to an embodiment of the invention.
Figure 13B:
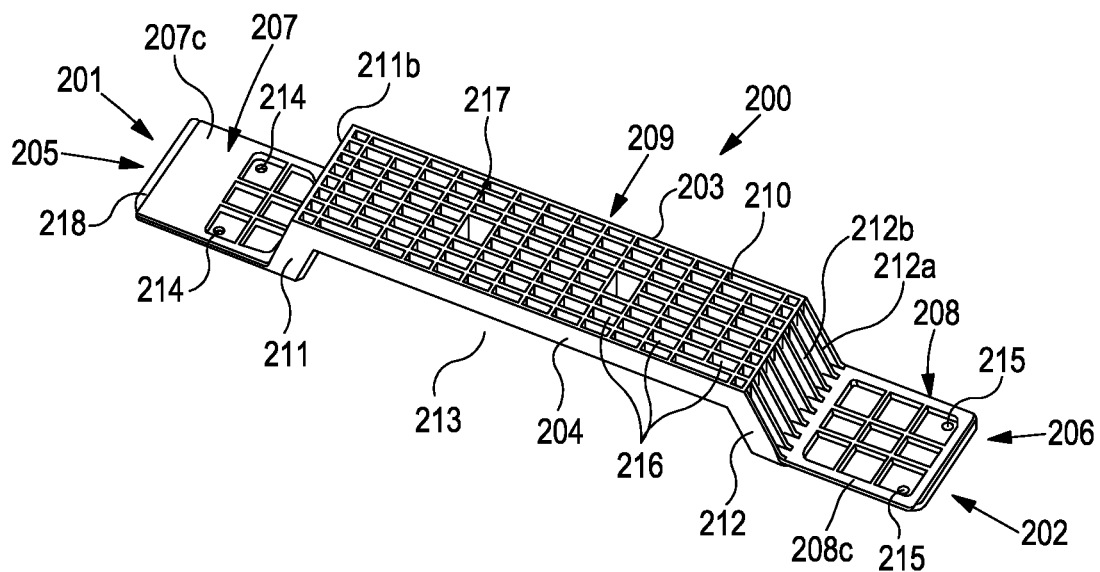

FIG. 13a is a perspective view of the top of the skid 200. FIG. 13b is a perspective view of the underneath of the skid 200. The skid 200 is generally elongate along a major axis A2, and has a first short side 201, second short side 202, first long side 203 and second long side 204. The long sides 203, 204 are parallel with the major axis A2 and the short sides 201, 202 are perpendicular to the major axis A2. The first short side 201 is located at a first end 205 of the skid 200 and the second short side 202 is located at a second end 206 of the skid 200. The first end 205 and second end 206 are at opposite ends of the skid 200.

The skid 200 comprises a first attachment portion 207 located at the first end 205 and a second attachment portion 208 located at the second end 206. The attachment portions 207, 208 are configured to allow attachment of the skid 200 to the lower deck of a platform 230 (see FIGS. 15 and 16). The skid 200 further comprises a support portion 209. The support portion 209 is located between the first and second attachment portions 207, 208, and has a supporting surface 210 (see FIG. 13b) which can be rested on a surface, such as the floor, conveyor belt, roller belt, or one or more support modules 120 of another platform (see FIG. 17).

The first attachment portion 207 is connected to the support portion 209 by a first leg 211 and the second attachment portion 208 is connected to the support portion 209 by a second leg 212. The first and second legs 211, 212 extend downward from the attachment portions 207, 208. That is, the first and second legs 211, 212 are not parallel with a plane of a lower deck of the platform 230 to which the skid 200 is connected. The legs 211, 212 provide clearance between the lower deck of the platform 230 and a surface upon which the skid 200 may sit, such as the floor, conveyor belt, another platform, or the support module of another platform.

The first and second attachment portions 207, 208 comprise a generally planar shape. The generally planar shape of the first and second attachment portions 207, 208 are arranged such that the plane of the first and second attachment portions 207, 208 are parallel with the plane of the platform 230 to which the skid 200 is attached. In the implementation shown, the first and second attachment portions 207, 208 comprise extended portions 207a, 208a which extend upwards from an upper surface 207b, 208b of the attachment portions 207, 208 and are configured to enter corresponding recess portions (not shown) on the lower deck of a platform 230. However, it will be appreciated that such extension portions 207a, 208a are optional.

The first attachment portion 207 has holes 214 located in the extended portion 207a to receive and guide fasteners such as screws. Similarly, the second attachment portion 208 has holes 215 located in the extended portion 208a to receive and guide fasteners such as screws. The holes 214, 215 are configured to align with corresponding holes on the platform 230 to which the skid 200 is to be attached, such that fasteners may be passed through the holes 214, 215 of the skid 200 so as to fix the skid 200 to the platform 230. Using removable fasteners, such as screws, allows the skid 200 to be removed from the platform 230. That is, the skid 200 is releasably attached to (e.g. detachable from) the platform 230. This is advantageous as it allows the skid 200 to be replaced if it becomes worn or damaged. Other attachment means may be used. For example, other releasable fasteners may include resiliently deformable elements, such as clips.

The legs 211, 212 extend downward from the attachment portions 207, 208 at an incline. That is, the legs 211, 212 extend away from the plane of the attachment portions 207, 208 at an angle which is not perpendicular to the plane. In an example implementation, the angle between the attachment portions 207, 208 and corresponding legs 211, 212, may be around 110°. In another implementation, the angle may be greater than 90° and less than 180°. In another implementation, the angle may be greater or equal to around 100° and less than or equal to around 120 degrees. The angle of the incline is such that the legs 207, 208 are angled towards one another in the direction from the respective attachment portion from which the leg extends towards the support portion 209.

Figure 22:
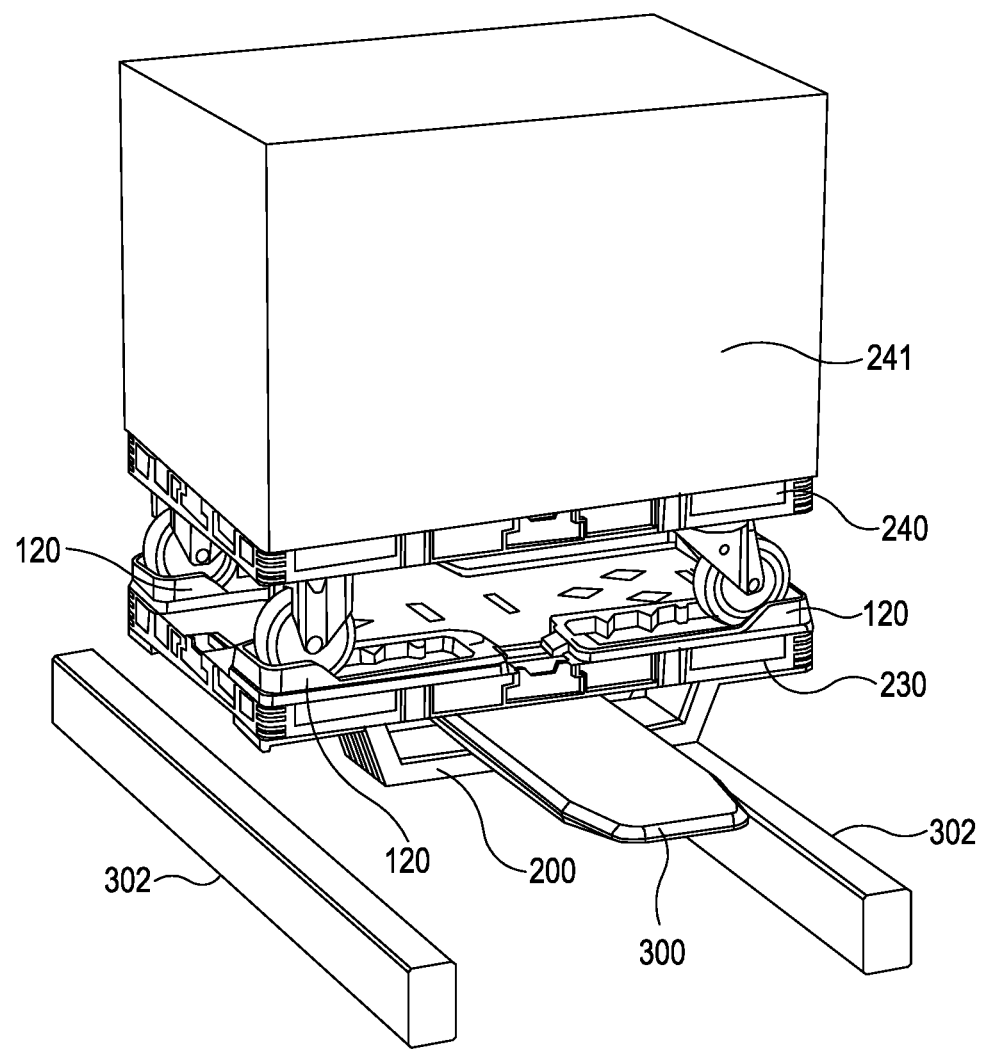
FIG. 22 is a perspective view of the platform of FIG. 21 after it has subsequently been lifted off the racking beams.

A space 213 is defined between the first leg 211, second leg 212 and support portion 209 which provides a position of entry for receipt of a tine. Therefore, when the skid 200 is attached to the lower deck of the platform 230, the space 213 may be used to insert a tine 300 and lift the platform 230 as shown in FIG. 22. That is, the space 213 provides access to the underside of the platform 230. Therefore, the platform 230 comprising the skid 200 may be easily lifted off a surface, such as the floor or a conveyor.

Figure 19:
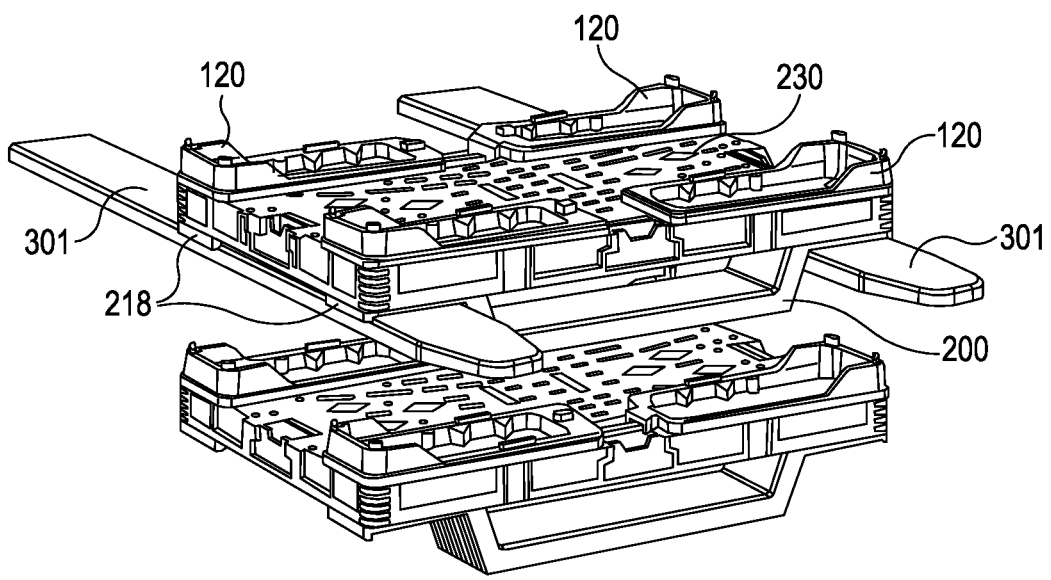
FIG. 19 is a perspective view of a platform being lifted off another platform by two tines of a fork.

Two additional spaces 213a, 213b are also created on the other sides of the legs 211, 212 to the sides forming space 213. The additional spaces 213a, 213b are defined by alignment surface 211b, 212b of the legs 211, 212 and lower surfaces 207c, 208c of the attachment portions 207, 208. Additional spaces 213a and 213b provide additional access to the underside of the platform 230. For example, as shown in FIG. 19, tines 301 of a fork may be inserted into spaces 213a, 213b and then lifted to contact the lower surfaces 207c, 208c of the attachment portions 207, 208.

Figure 21:
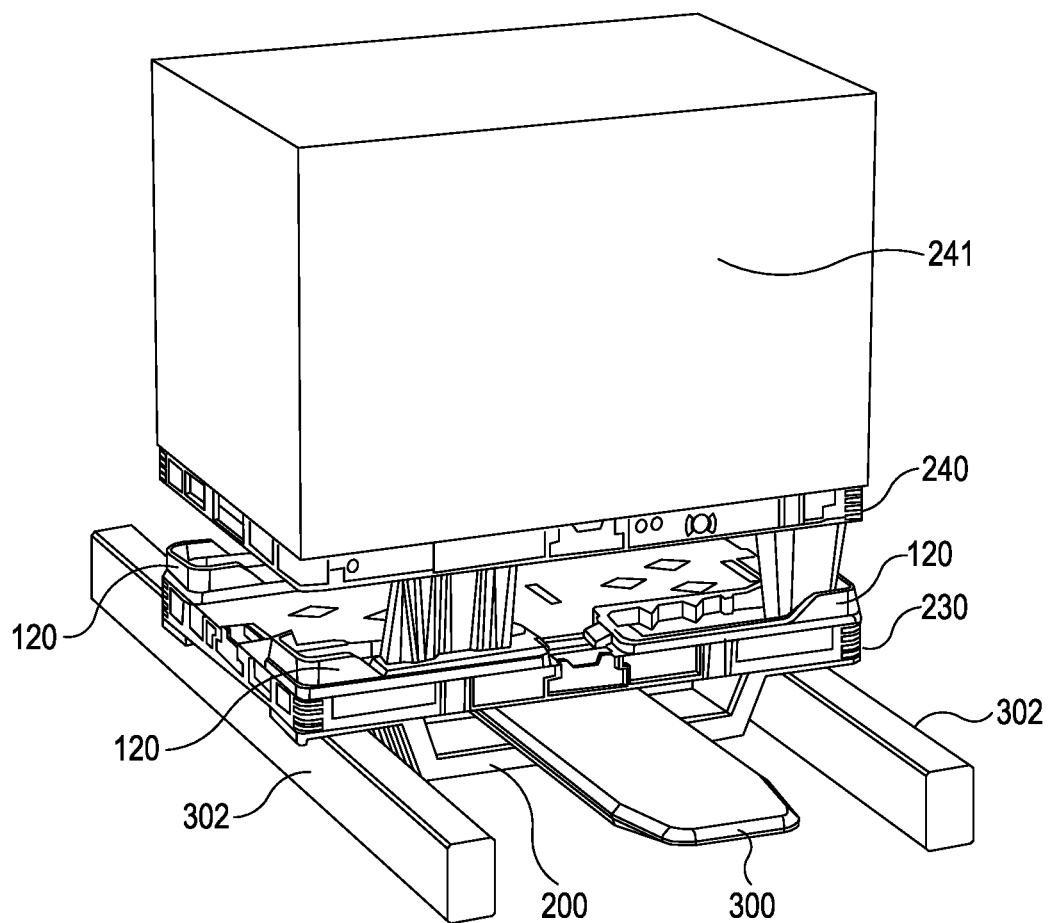
FIG. 21 is a perspective view of a platform in a racking position resting on two racking beams.

The alignment surfaces 211b, 212b are located along the edge of the legs 211, 212 which face away from each other. That is, the alignment surface 211b of the first leg 211 faces the first short end 205 of the skid 200 and the alignment surface 212b of the second leg 212 faces the second short end 206 of the skid 200. The alignment surfaces 211b, 212b present an inclined surface to tines or beams which has the effect of centring the platform 230. That is, if a platform 230 having the skid 200 is loaded off-centre onto a fork having two tines 301, one tine of the fork will make contact with one of the alignment surfaces 211b, 212b prior to the other tine making contact with the other alignment surface. Such contact will cause the platform 230 to move horizontally towards a centred position, such that both tines 301 of the fork make contact with the lower surfaces 207c, 208c of the attachment portions 207, 208. In a similar manner, the alignment surfaces 211b, 212b can centre the platform 230 during deployment on racking beams 302, as shown in FIG. 21. That is, if the platform 230 is off-centre as it is moved downwards onto the beams 302, contact between one of the beams 302 and one of the alignment surfaces 211b, 212b will cause the platform 230 to move horizontally, centring the platform 230.

It will be appreciated that while the legs 211, 212 are shown as being inclined, in some implementations only the alignment surface 211b, 212b need be inclined. That is, the legs 211, 212 may be wedge shaped, for example. The legs 211, 212 comprise ribs 211a, 212a, which help provide rigidity to the legs 211, 212. It will be appreciated that there may be no ribs in the legs 211, 212 in some implementations.

Referring to FIG. 13b, the supporting surface 210 is a flat surface having a number of apertures 216. In the implementation shown in FIG. 13b, the apertures 216 are defined by a criss-cross arrangement of ribs 217. The apertures 216 may, or may not, extend through the entire thickness of the skid 200. In the implementation shown, the apertures 216 do not extend through the entire thickness of the skid 200, such that a top surface of the support portion 209 does not have apertures (see FIG. 13a). It will be appreciated that in alternative arrangements, the ribs may extend through to the top surface of the support portion 209. The apertures 216 reduce the weight of the skid 200, and also provide locations at which projections or lugs of another object may penetrate, such as the lugs 122, 123, 124 of the support module 120, which can penetrate when the skid 200 is stacked on top of a another platform having support modules 120. The shape/size of the apertures 216 may be any suitable shape/size, and not all apertures 216 need be the same shape/size. For example, the shape/size of the apertures 216 may mirror the shape/size of lugs 122, 123, 124.

The first attachment portion 207 terminates in a first lip 218 and the second attachment portion 208 terminates in a second lip 219. The lips 218, 219 project downward, out of the plane of the attachment portions 207, 208, and are arranged along each end of the short sides 201, 202 at either end 205, 206 of the skid 200. The lips 218, 219 can help secure the platform in place when loaded onto beams or tines. As can be seen more clearly in FIG. 17, the lips 218, 219 have a curved surface 217a, 218a on a side facing inward, towards the legs 211, 212. The curved surfaces 217a, 218a provides the lip with improved strength. Additionally, the curved surfaces work with the alignment portions 211b, 212b to help align the platform 230 with the tines or beams, and acts as an additional safety hook to keep the platform 230 fully supported between the tines or beams. If the lips 218, 219 become wore over time, the skid 200, being detachable from the platform 230, may be easily replaced.

Figure 14:
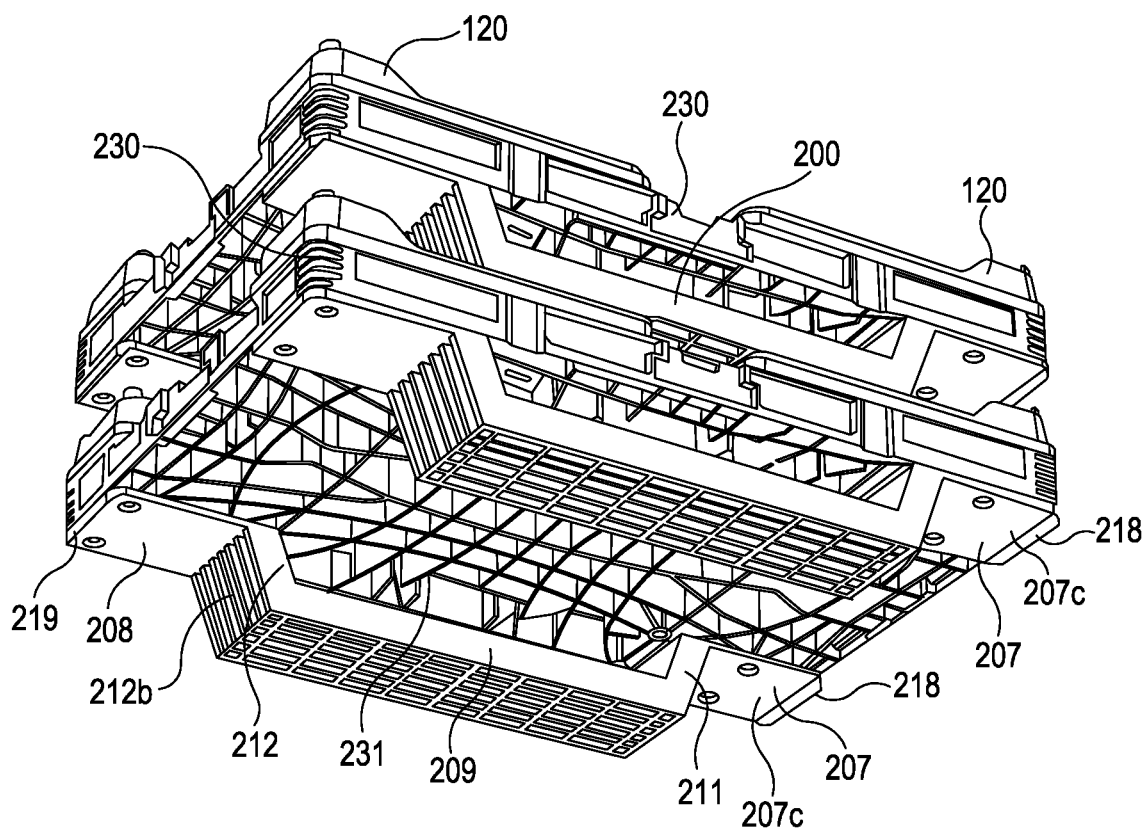
FIG. 14 is a perspective view of the underside of a platform stack comprising two platforms.
Figure 15:
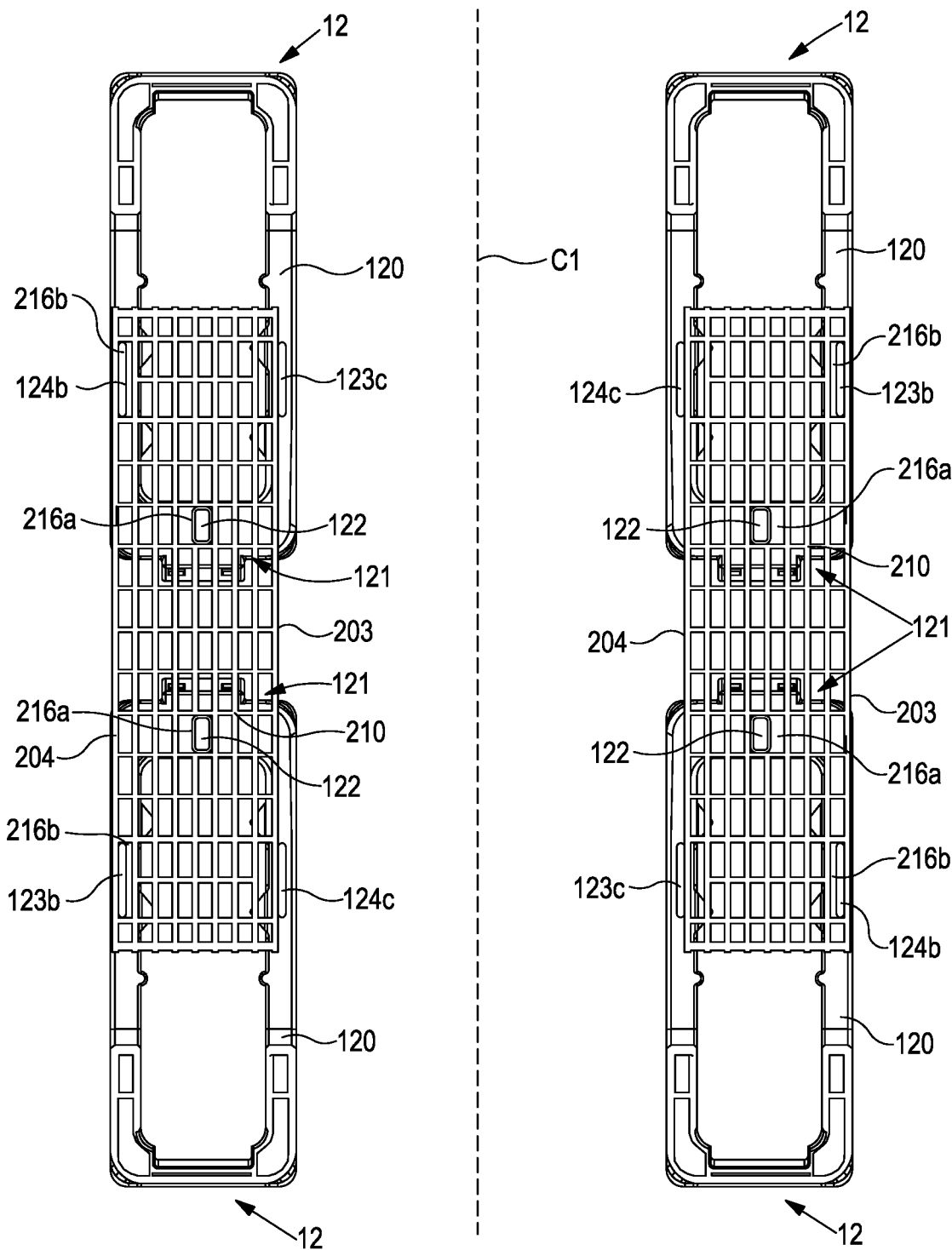
FIG. 15 is view from below of four support modules and two supporting surfaces of two skids.

FIG. 14 shows a perspective view of the underside of a platform stack. The platform stack comprises two platforms 230 in a stacked arrangement. The two platforms 230 have two skids 200 attached to a lower deck 231 of the platform 230, and four support modules 120 attached to a top deck of the platforms 230. The arrangement of the apertures 216 on the skid 200 shown in FIG. 14 differs slightly from that shown in FIG. 13b. It will be appreciated that any suitable arrangement of apertures may be formed so as to correspond with matching lugs on the support module 120.

Figure 16:
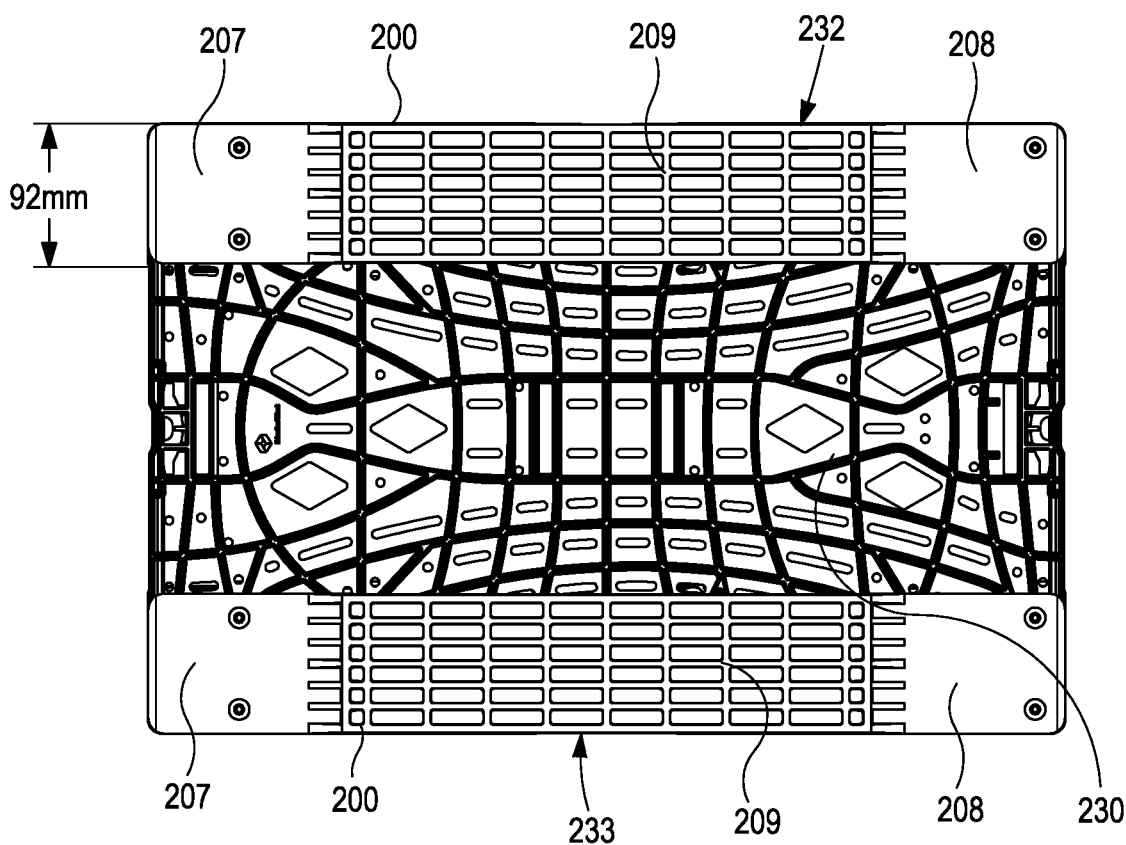
FIG. 16 is a view of the bottom of a platform.
Figure 17:
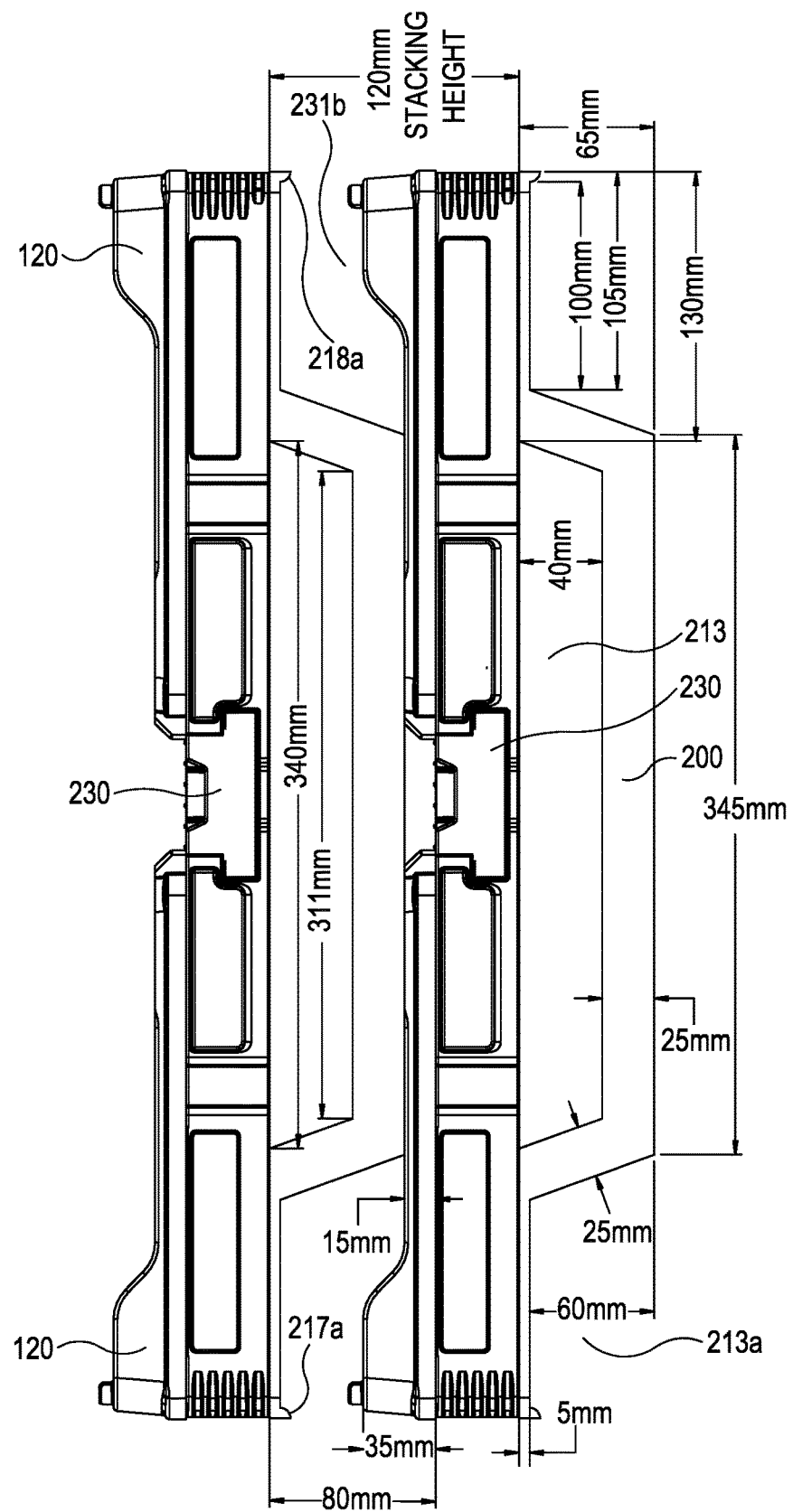
FIG. 17 is a side view of the platform stack of FIG. 15.
Figure 18:
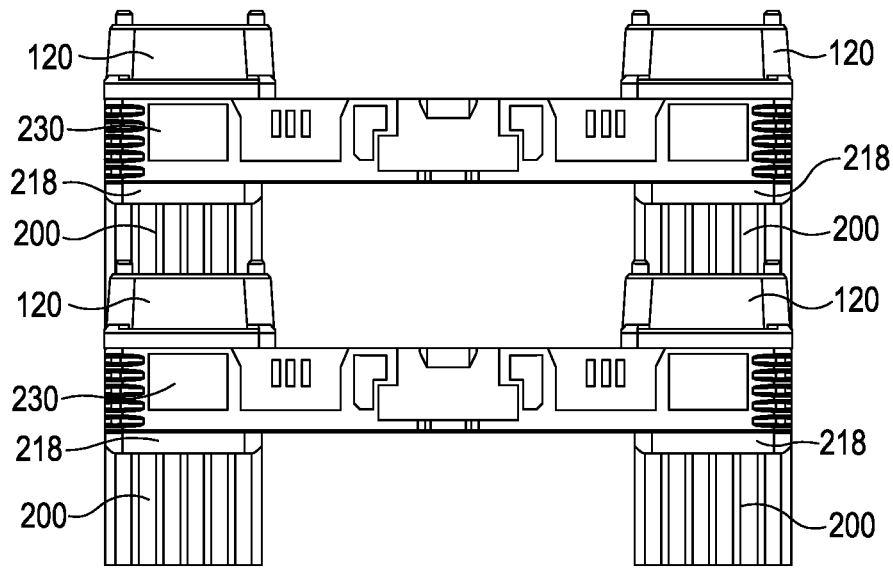
FIG. 18 is an end on view of the platform stack of FIG. 15.

FIG. 16 shows a view of the bottom of the platform 230, and FIGS. 17 and 18 show a side view of the platform stack and an end on view of the platform stack respectively. FIGS. 16 and 17 show example dimensions in mm of features of the platform stack. It will be appreciated that these dimensions are only examples and other dimensions may be used.

As can be seen in FIGS. 16 and 18, the skid 200 is contained within the footprint of the platform 230. Referring to FIG. 17, it can be seen that the reduction in height of the first short ends 121 of the support modules 120 allows the skid 200 to sit lower than it otherwise would using the support module 2 described above with reference to FIGS. 1a and 1b. The reduction in height of the first short ends 121 therefore reduces the total height of a plurality of stacked platforms 230, thus saving space.

The skids 200 are arranged along each long side 232, 233 of the platform 230, and are arranged generally in line with the support modules 120. This is more clearly shown in FIG. 15, which shows a view from underneath the platform 230, but only shows the support modules 120 and the supporting surface 210 of the skids 200. In the arrangement shown in FIG. 15, the lugs 123, 124 of each support module 120 may be referred to as either outboard lugs 123b, 124b or inboard lugs 123c, 124c depending on their relative location, where outboard refers to a direction away from central axis C1 and inboard refers to a direction towards centre axis C1. As can be seen, only the outboard lugs 123b, 124b of each support module 120 enter apertures 216b. The inboard lugs 123c, 124c do not enter any aperture, but abut against the long side 203, 204 of the skid 200. As can be seen, the width of the skid 200 is less than the width of the support modules 120. However, it will be appreciated that in some implementations the skid 200 may have a width greater than the width of the support modules 120.

FIG. 19 shows a perspective view of a platform 230 being lifted off another platform 230 by two tines 301 of a fork. The forks may be of a forklift, automated racking system or the like. As can be seen, lip 218 provides a surface which the tine 301 can abut against, preventing undesirable horizontal movement of the platform 230.

Figure 20:
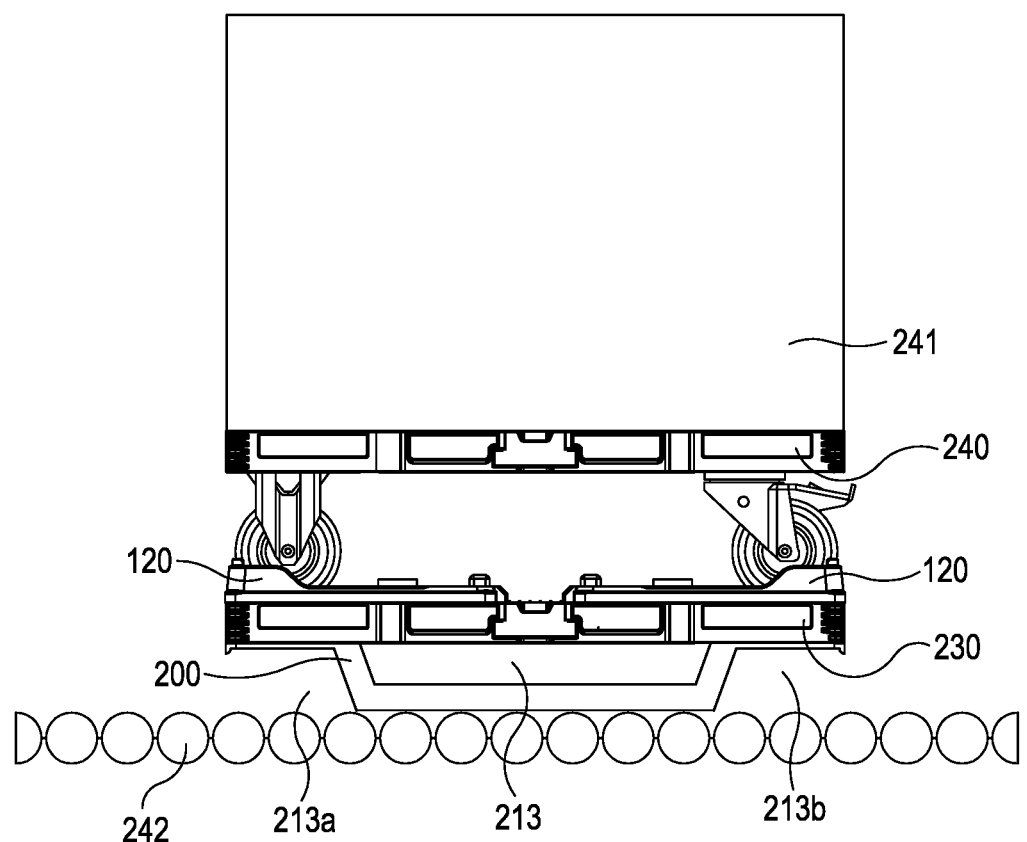
FIG. 20 is a side view of a platform on a roll conveyer.

FIG. 20 shows a side view of a platform 230 on a roll conveyer 242. The platform 230 is shown as supporting a dolly 240, where the dolly 240 is supporting a load 241. As can be seen, the space 213 provided by the legs 211, 212 provides a position of entry for receipt of a tine, allowing the platform 230 to be conveniently lifted off the roll conveyer 240.

FIG. 21 shows a perspective view of the platform 230 in a racking position resting on two racking beams 302. A tine 300 has entered the space 213 so as to lift the platform 230 off the racking beams 302, and FIG. 22 shows the platform 230 after it has subsequently been lifted off the racking beams 302.

The platform 230 as disclosed provides an improved platform which can be conveniently and safely stacked when empty, used to support a range of dollys or pallets, used on gravity or automated conveyor systems, and which provides a safe means for handling.

Whilst the illustrated examples are specially adapted platforms, the support modules can be used with any variety of platforms. For example, the support modules could be attached, or retrofitted, to standard wooden pallets. Where the platform differs from the illustrated platforms, the projections 10a, 10b may be omitted from the support modules due to a lack of corresponding slots in the top deck of the platform.

The alternative embodiment of FIGS. 8a to 9 may be particularly well suited for attachment to wooden pallets, due to the fixing members 101. In particular, the ability to secure a fastener through the bores 103a, 103b of the fixing member 101 from above is particularly useful due to potentially difficult, and awkward, access from an underside of the wooden pallet. It may not be possible to access an underside of the top deck of the wooden pallet.

Once attached to the platform, the support module may remain attached to the platform for the remainder of the platform's life. However, if required, the support module may be removed for replacement if the support module becomes damaged.

Rectangular plan dimensions of load bearing platforms (commonly known as pallets) including but not limited to those that conform to ISO 6780:2003(E) have lengths and widths of 1200×800 mm (commonly known as Euro size), 1200×1000 mm (commonly known as full size), and 1219×1016 mm. Other standard sizes may be used in other regions of the world. The term "half pallet" is half of the size of the standard pallet according to the particular standard being used. Similarly, the term "quarter pallet" is a quarter of the size of the standard pallet according to the particular standard being used. For example, if the standard used in one region is 1200×800 mm, then a half pallet will have dimensions of 800×600 mm, and a quarter pallet will have dimensions of 600×400 mm. These standard dimensions are also applied to wheeled platforms commonly known as dollys, and also referred to as pallets on wheels.

The illustrated slave and pallets, and dollys, are quarter pallets. However, the support modules may also be used with half pallets, or full size pallets, to name but two specific examples of pallet size. Similarly, for the alternative recessed embodiment, the support modules may be recessed into full size, half or quarter pallets, or other such pallets. The recessed arrangement may be particularly applicable to half pallets. This is particularly of interest because half pallets are a popular size of fractional pallet for use in the distribution of quarter pallets in industry. Furthermore, half pallets are particularly well suited for use in conjunction with automated racking systems.

Where the support modules are attached to platforms of a given size, the plurality of support modules may be provided in a number of arrangements. For example, where the platform is a half pallet, four support modules may be used to provide stacking functionality for half pallets to be stacked onto the half pallet. Alternatively, eight support modules may be used in a 2×4 arrangement to provide functionality for two quarter pallets to be stacked onto the half pallet. A variety of tessellation, or arrangement, options are available, as will be appreciated by the person skilled in the art. If the platform is a full pallet, a 4×4 arrangement of 16 support modules may be used to stack quarter pallets on the platform. Similarly, when recessed supports are recessed into a top deck of a pallet of a given size, a plurality of recessed supports may be provided in a number of arrangements.

The support module may be manufactured from polypropylene or polyethylene or other suitable material. It is desirable that the support module is made from the same material as the platform for reasons of recyclability. The support module may be manufactured by injection moulding or any other suitable manufacturing process.

The skid may be manufactured from polypropylene or polyethylene or other suitable material. It may be desirable that the skid is made from the same material as the platform for reasons of recyclability. The skid may be manufactured by injection moulding or any other suitable manufacturing process. The skid may be manufactured from metal. For example, the skid may be made of aluminium by a suitable moulding process (e.g. foundry). It may be advantageous to make the skid from metal to provide the skid with increased strength and durability. Any suitable metal may be used.

The described and illustrated embodiment is to be considered as illustrative and not restrictive in character, it being understood that only a preferred embodiment has been shown and described and that all changes and modifications that come within the scope of the inventions as defined in the claims are desired to be protected. In relation to the claims, it is intended that when words such as "a," "an," "at least one," or "at least one portion" are used to preface a feature there is no intention to limit the claim to only one such feature unless specifically stated to the contrary in the claim. When the language "at least a portion" and/or "a portion" is used the item can include a portion and/or the entire item unless specifically stated to the contrary.

Optional and/or preferred features as set out herein may be used either individually or in combination with each other where appropriate and particularly in the combinations as set out in the accompanying claims. The optional and/or preferred features for each aspect of the invention set out herein are also applicable to any other aspects of the invention, where appropriate.

The invention claimed is:

1. A platform configured to receive a pallet, the platform comprising:
   a top deck, the top deck comprising at least one integrally formed recessed support configured to receive a pallet support of the pallet, the at least one integrally formed recessed support comprising a perimeter recessed in the top deck and which defines a cavity configured to receive the pallet support,
   wherein:
      the at least one integrally formed recessed support comprises a raised portion that extends from a lower surface of the cavity and is configured to enter an opening of the pallet support, and
      the at least one integrally formed recessed support comprises at least one inwardly facing projection or at least one upwardly facing projection.

2. The platform of claim 1, wherein the at least one integrally formed recessed support is a rectangular-shaped recessed support, with the rectangular-shaped recessed support comprising two short sides and two long sides connected together.

3. The platform of claim 2, wherein the at least one integrally formed recessed support is symmetrical about a plane of symmetry which passes through midpoints of each of the two short sides.

4. The platform of claim 2 wherein one of the two short sides is at least partly arcuate for receipt of a wheel.

5. The platform of claim 1 wherein the raised portion extends so that it is flush with the top deck of the platform.

6. The platform of claim 1, wherein the at least one integrally formed recessed support comprises two long sides, and wherein the at least one inwardly facing projection is adjacent to at least one of the two long sides.

7. The platform of claim 6 wherein the at least one inwardly facing projection comprises a pair of projections, with each projection adjacent to a respective long side.

8. The platform of claim 1, wherein the at least one integrally formed recessed support comprises both the at least one upwardly facing projection and the at least one inwardly facing projection.

9. The platform of claim 1 wherein the platform comprises at least four recessed supports modules.

10. The platform of claim 1, wherein the platform forms part of a fractional pallet.

11. The platform of claim 10, wherein the platform forms part of a half pallet.

12. The platform of claim 11, wherein the platform forms part of a half display pallet.

13. A pallet assembly comprising:
a pallet; and
a platform configured to receive the pallet when stacked thereon, the platform comprising:
    a top deck, the top deck comprising at least one integrally formed recessed support configured to receive a pallet support of the pallet, the at least one integrally formed recessed support comprising a perimeter recessed in the top deck and which defines a cavity configured to receive the pallet support,
wherein:
    the at least one integrally formed recessed support comprises a raised portion which extends from a lower surface of the cavity and extends so that it is flush with the top deck of the platform, and
    the at least one integrally formed recessed support comprises at least one inwardly facing projection or at least one upwardly facing projection.

14. The pallet assembly of claim 13, wherein the pallet is a dolly.

15. The pallet assembly of claim 13, wherein the pallet support of the pallet stacked on the platform is a foot.

16. The pallet assembly of claim 15, wherein the foot comprises an opening wherein the raised portion fits within the opening so as to prevent lateral movement of the foot with respect to the raised portion.

17. A pallet assembly comprising:
a pallet; and
a platform configured to receive the pallet when stacked thereon, the platform comprising:
    a top deck, the top deck comprising at least one integrally formed recessed support configured to receive a pallet support of the pallet, the at least one integrally formed recessed support comprising a perimeter recessed in the top deck and which defines a cavity configured to receive the pallet support,
wherein:
    the at least one integrally formed recessed support comprises a raised portion that extends from a lower surface of the cavity and is configured to enter an opening of the pallet support, and
    the at least one integrally formed recessed support comprises at least one inwardly facing projection or at least one upwardly facing projection.

18. The pallet assembly of claim 17, wherein the pallet is a dolly.

19. The pallet assembly of claim 17, wherein the pallet support is a foot.

* * * * *